United States Patent [19]
Knoblock et al.

[11] Patent Number: 5,930,779
[45] Date of Patent: Jul. 27, 1999

[54] WEB BASED SYSTEM AND METHOD TO AUTOMATE STORAGE OF POWER PLANT DATA AND CALCULATION OF BATTERY RESERVES

[75] Inventors: Terry Knoblock, Wylie; Gregory G. Carlson, Plano; Paul Michael Golobay, Branch, all of Tex.

[73] Assignee: MCI Communications Corporation, Washington, D.C.

[21] Appl. No.: 08/823,555

[22] Filed: Mar. 25, 1997

[51] Int. Cl.⁶ ...................................................... G06F 17/30
[52] U.S. Cl. ...................... 705/412; 705/400; 395/182.2; 707/503
[58] Field of Search ..................................... 705/400, 412; 707/1, 2, 102, 104, 8, 9, 201, 503; 395/182.2, 182.12, 500, 726, 750.06; 307/46, 66

[56] References Cited

U.S. PATENT DOCUMENTS

| | | | |
|---|---|---|---|
| 4,031,407 | 6/1977 | Reed | 307/87 |
| 5,018,148 | 5/1991 | Patel et al. | 395/182.2 |
| 5,091,139 | 2/1992 | Chao et al. | 376/216 |
| 5,117,324 | 5/1992 | Johnson, Jr. | 395/182.2 |
| 5,148,043 | 9/1992 | Hirata et al. | 307/66 |
| 5,283,905 | 2/1994 | Saadeh et al. | 395/750.06 |
| 5,311,562 | 5/1994 | Palusamy et al. | 376/215 |
| 5,369,353 | 11/1994 | Erdman | 323/207 |
| 5,414,861 | 5/1995 | Horning | 365/229 |
| 5,418,945 | 5/1995 | Carter et al. | 707/8 |
| 5,483,108 | 1/1996 | Girald et al. | 307/64 |
| 5,604,892 | 2/1997 | Nuttall et al. | 395/500 |
| 5,642,100 | 6/1997 | Farmer | 340/636 |

OTHER PUBLICATIONS

Don Burgio, MCI Telecommunications Corporation, *MCI SIteVu*, Copyright 1996, Made available to the public Apr. 1996.

*Primary Examiner*—James P. Trammell
*Assistant Examiner*—Cuong H. Nguyen

[57] ABSTRACT

A system and method for remotely inputting power plant data into a database and for calculating reserve times for which power plants can supply power to consumer equipment. The system includes a data input module for receiving power data from a remote user and for inputting power plant data into a database. In a preferred embodiment, the system is an integral part of a comprehensive site planning facility and interfaces with a permanent site facility database and a temporary relational database. Both databases store data relating to sites, power plants associated with sites and component data related to power plants. The data input module permits users to add, modify and remove power plant data associated with sites which are stored in the temporary relational database. The data input module also permits users to edit consumer equipment load values associated with power plants, regardless of whether data for associated sites are maintained in the site facility planning database or the temporary relational database. A calculation module retrieves data from the database and calculates reserve times for which power plants can supply power to consumer equipment. As a precautionary measure, the calculation module preferably employs correction factors which exaggerate consumer equipment loads and underestimate power plant reserve time. Users interface with the system via a web browser interface thus permitting users to access the system from any computer running a browser and connected to a company-wide intranet or the like. In an alternative embodiment, the system implemented is a stand-alone system in which only the temporary relational database is employed.

18 Claims, 49 Drawing Sheets

| FIG. 3C | FIG. 3F | FIG. 3I | FIG. 3L |
|---------|---------|---------|---------|
| FIG. 3D | FIG. 3G | FIG. 3J | FIG. 3M |
| FIG. 3E | FIG. 3H | FIG. 3K | FIG. 7 |

FIG. 3B

Edit Plant Data and Calculate Reserve Time

The Power Pages
SiteVU WWW Interface
Copyright ©1996, networkMCI Services
All rights reserved.
For questions or comments regarding The Power Pages please contact the Power Quality
Management Center (PQMC) at VNET 757-5740, 757-5741, or 757-5742.
FIG. 15

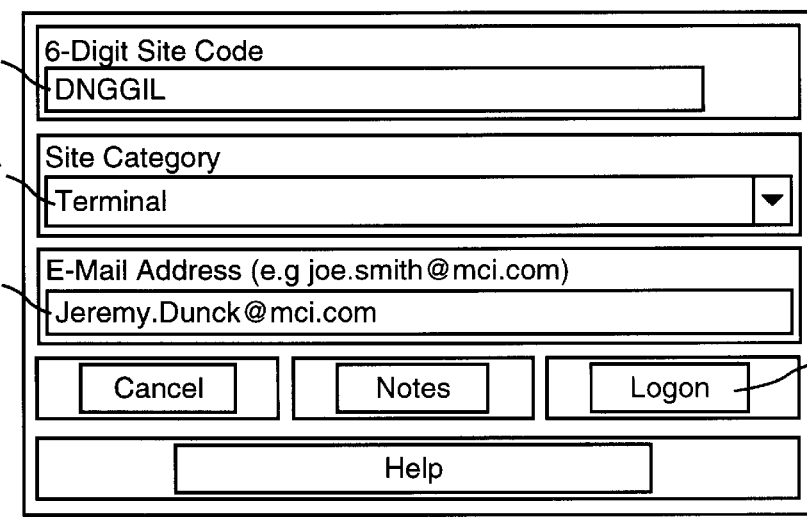
For questions or comments regarding The Power Pages please contact the Power Quality Management Center at VNET 757-5740, 757-5741, or 757-5742.
FIG. 16

1810

Add Battery Plant

Site Code: DNGGIL    Site Type: Switch

| General Information | Plant Name (Type & ID#): | ▼ | 1812 |
| | | | |

| Battery Information | Actual Load (Amps): | | 1814 |
| | Voltage: | O 24 Volt<br>O 48 Volt<br>O UPS | 1816 |
| | Number of Battery Strings: | | 1818 |

| Rectifier Information | Number of Rectifiers For This Plant (N/A for UPS): | | 1820 |

| Cancel | Help | Next-> | 1822 |

NOTES:
● For questions or comments regarding The Power Pages please contact the Power Quality Mangagement Center at VNET 757-5740, 757-5741, or 757-5742.

| Delete Battery Plant | |
|---|---|
| Site Code: DNGGIL | |
| Plant Name: Terminal 1 ▼ | 1912 |
| Cancel OK | 1914 |

2010

| View/Edit Batteries | |
|---|---|
| Site Code: DNGGIL | |
| Plant Name: ▼ | 2014 |
| Cancel OK | 2012 |

2110

View/Edit Batteries

Site Code: DNGGIL   Site Type: Switch
Plant Name: Terminal 1   Voltage: 48

| Battery Information | | | |
|---|---|---|---|
| String | Vendor | Model # | Install Date (MM/DD/YY) |
| 1 | Exide | GU-45 | 12/3/96 |
| 2 | Exide | GU-45 | 12/3/96 |

Add Record(s): [ ]  [Add] ←2114
Remove Record(s): [ ]  [Remove] ←2116

2118→ [Cancel]  [Help]  [Save Changes] ←2112

NOTES:
• Fields on this screen have been formatted to fit reasonably well into tables. If the information you must enter appears longer than the field simply keep typing. All field information may not be visible at one time but everything that is entered will be saved.
• For questions or comments regarding The Power Pages please contact the Power Quality Management Center at VNET 757-5740, 757-5741, or 757-5742.

```
┌─────────────────────────────────────────────────┐
│ View/Edit Rectifiers                            │
│ Site Code: DNGGIL                               │
├─────────────────────────────────────────────────┤
│ Plant Name: │ Terminal 1                    ▼ │ │
├─────────────────────────────────────────────────┤
│ │ Cancel │                            │ OK │   │
└─────────────────────────────────────────────────┘
```

2310 ⟶

View/Edit Rectifiers

Site Code: DNGGIL          Site Type: Switch
Plant Name: Terminal 1     Voltage: 48

| Rectifier Information |||||
|---|---|---|---|---|
| Rectifier | Vendor | Model # | Serial# | Install Date (MM/DD/Y |
| 1 | Lorain | RHM400E50 | 1120 | 12/03/96 |
| 2 | Lorain | RHM400E50 | none | 12/03/96 |
| 3 | Lorain | RHM400E50 | none | 12/03/96 |
| 4 | Lorain | RHM400E50 | 1098 | 12/03/96 |

Add Record(s): [  ] [ Add ] ⟵ 2314
Remove Record(s): [  ] [ Remove ] ⟵ 2316

2318 ⟶ [ Cancel ] [ Help ] [ Save Changes ] ⟵ 2312

NOTES:
- Fields on this screen have been formatted to fit reasonably well into tables. If the information you must enter appears longer than the field simply keep typing. All field information may not be visible at one time but everything that is entered will be saved.
- For questions or comments regarding The Power Pages please contact the Power Quality Management Center at VNET 757-5740, 757-5741, or 757-5742.

View/Edit Generators

2412  Site Code: DNGGIL          Site Type: Switch

| Generator 1 (* = 0 |||
| --- | --- | --- |
| Phase Type:<br>3-Phase ▼ | Size (KVA):<br>1375 | Si:<br>1 |
| Vendor:<br>Cummins/ONAN | Model #:<br>KTA-38-G1 | Oι<br>4 |
| Phase Current A:<br>450 | Phase Current B:<br>450 | Pl<br>4 |

| Generator 2 (* = 0 |||
| --- | --- | --- |
| Phase Type:<br>3-Phase ▼ | Size (KVA):<br>1788 | Si:<br>1 |
| Vendor:<br>Cummins/ONAN | Model #:<br>KTA-50-G3 | Oι<br>4 |
| Phase Current A:<br>500 | Phase Current B:<br>500 | Pl<br>5 |

2414

2410

2416

|  | Generator 3 (* = 0 |  |
|---|---|---|
| Phase Type:<br>3-Phase ▼ | Size (KVA):<br>1375 | Si:<br>1 |
| Vendor:<br>Cummins/ONAN | Model #:<br>KTA-38-G1 | Ou<br>4 |
| Phase Current A:<br>450 | Phase Current B:<br>450 | Ph<br>4 |

|  | Generator 4 (* = 0 |  |
|---|---|---|
| Phase Type:<br>3-Phase ▼ | Size (KVA):<br>1788 | Si:<br>1 |
| Vendor:<br>Cummins/ONAN | Model #:<br>KTA-50-G3 | Ou<br>4 |
| Phase Current A:<br>500 | Phase Current B:<br>500 | Ph<br>5 |

2418

| Add Record(s): | | Add | 2424 |
| Remove Record(s): | | Remove | 2426 |

2420

| Cancel | Help | Save Changes | 2422 |

NOTES:
- Fields on this screen have been formatted to fit reasonably well into tables. If the information you must enter appears longer than the field simply keep typing. All field information may not be visible at one time but everything that is entered will be saved.
- For questions or comments regarding The Power Pages please contact the Power Quality Management Center at VNET 757-5740, 757-5741, or 757-5742.

| Calculate Reserve Time | | |
|---|---|---|
| Site Code: DNGGIL | | |
| Plant Name: | Terminal 1 ▼ | 2512 |
| Actual Load: | 125 | 2514 |
| Cancel | | OK | 2516 |

2710

| What-If Scenarios | |
|---|---|
| Site Code: DNGGL | |
| Plant Name: | Terminal 1 |
| Help | Reserve Time S |
| Cancel | Rectifier Scenarios |

2810

What-If : Reserve Time Scenarios

Site Code: DNGGIL  Site Type: Switch
Plant Name: Terminal 1  Voltage: 48

| Battery Information | | | | |
|---|---|---|---|---|
| Use | Vendor | Model # | Install Date (MM/DD/YY) | Type (Amp Hrs) |
| ☑ | Exide | GU-45 | 12/3/96 | 3900 |
| ☑ | Exide | GU-45 | 12/3/96 | 3900 |

| Actual Load: | Additional Amp Hrs: | Calculate |
|---|---|---|
| 1135 | | |

| Done | Reset | Help |
|---|---|---|

NOTES:
● For questions or comments regarding The Power Pages please contact the Power Quality Management Center at VNET 757-5740, 757-5741, or 757-5742.

FIG. 28

2910

What-If : Rectifier Scenarios

Site Code: DNGGIL  Site Type: Switch
Plant Name: Terminal 1  Voltage: 48

| Rectifier Information | | | | | |
|---|---|---|---|---|---|
| Use | Vendor | Model # | Serial # | Install Date (MM/DD/YY) | Full Load Amp Rating |
| ☑ | Lorain | RHM400E50 | 1120 | 12/03/96 | 400 |
| ☑ | Lorain | RHM400E50 | none | 12/03/96 | 400 |
| ☑ | Lorain | RHM400E50 | none | 12/03/96 | 400 |
| ☑ | Lorain | RHM400E50 | 1098 | 12/03/96 | 400 |

Actual Load: 1135    Additional Amp Hrs:    [Calculate]

[Done]    [Reset]    [Help]

NOTES:

• For questions or comments regarding The Power Pages please contact the Power Quality Management Center at VNET 757-5740, 757-5741, or 757-5742.

FIG. 29

3010

The Power Pages - Help

Document Revision 1.0.0, 9/29/96

Table of Contents

I. Overview of the Power Pages
II. Power Pages Process - The Big Picture
III. The Control Panel
IV. The Pieces in the Process
    a. Logging in to the System
    b. Adding Battery Plants
    c. Deleting Battery Plants
    d. Viewing/Editing Batteries
    e. Viewing/Editing Rectifiers
    f. Viewing/Editing Generators
    g. Calculating Reserve Times
V. Points of Contact Overview of the Power Pages The Power Pages is a Web-based application which serves two primary purposes. First, it is a data-collection facility used to gather information regarding site battery plants, including battery string vendors, model numbers, and sizes, as well as site generator information. Second, the application provides a standardized, automated method of calculating battery reserve times based on actual loads and the collected battery plant information.

Return to Table of Contents

Power Pages Process - The Big Picture

FIG. 30

WEB BASED SYSTEM AND METHOD TO AUTOMATE STORAGE OF POWER PLANT DATA AND CALCULATION OF BATTERY RESERVES

CROSS-REFERENCE TO OTHER APPLICATIONS

The following applications of common assignee contain some common disclosure as the present application:

U.S. Patent Application entitled "System and Method for Recording, Maintaining and Viewing Configuration and Placement of Equipment in Field Sites", filed concurrently herewith, Attorney Docket No. RIC-97-002 (1575.236).

U.S. Patent Application entitled "Method for Organizing a Relational Database Used for Storing Data Related to the Configuration and Placement of Equipment in Field Sites", filed concurrently herewith, Attorney Docket No. RIC-97-026 (1575.237)

U.S. Patent Application entitled "System and Method to Automate Equipment Placement at Remote Sites", filed concurrently herewith, Attorney Docket No. RIC-97-006 (1575.239).

U.S. Patent Application entitled "System and Method for Defining Equipment at Down to the Rackface Level", filed concurrently herewith, Attorney Docket No. RIC-97-007 (1575.240)

U.S. Patent Application entitled "Enhanced System and Method for Report Generation", filed concurrently herewith, Attorney Docket No. RIC-97-009 (1575.242)

The above-listed applications are incorporated herein by reference in their entireties.

BACKGROUND OF THE INVENTION

1. Field of the Invention

The present invention relates generally to telecommunication equipment and, more particularly, to a system and method for remotely inputting power plant data into a database and for calculating reserve times for power plants.

2. Related Art

A long distance telecommunications service provider (hereinafter "service provider"), typically maintains billions of dollars worth of network assets. The majority of such network assets are typically installed in numerous field sites located throughout a vast geographical region that encompasses a long distance telephone network. For example, MCI maintains billions of dollars worth of transmission and power equipment located in hundreds of remote field sites throughout North America.

Typically, much of the network equipment is arranged and mounted in equipment bays. Such equipment bays are typically organized as a plurality of side-by-side racks, each having a plurality of top-to-bottom shelves, wherein each shelf contains a plurality of vertically positioned slots. Circuit cards are typically installed in the vertically positioned slots. In addition, other types of modules are installed on the shelves.

Conventionally, it has been difficult for service providers to maximize the use of space within remote sites. Typically, site planners design the layout of remote sites down to the rack or "footprint" level. These plans are then used by engineering groups to design the layout of each rack at the "rackface" level. That is, the engineering groups arrange the shelves within each rack, and the cards and other modules within each shelf.

In addition, changes to the configuration of racks at the rackface level are often made by field engineering groups that respond to onsite equipment change requirements. Such changes occur often in the ordinary course of business.

However, it is often the case, that changes made in the field are not recorded. Consequently, site planners and other groups do not necessarily have access to accurate and updated information pertaining to the layout and configuration of equipment within remote sites. This makes it very difficult for site planners and other groups to plan ahead for future changes and maximize the use of the available space with remote sites. It also makes it difficult for power engineers to accurately estimate the ongoing and changing power requirements for remote sites. This can cause unwanted delays and down times due to inadequate power reserves.

In addition, the conventional method of site planning down to the rack footprint level has proven inadequate. For example, it is often necessary for engineers to determine the precise component parts that make up particular equipment racks in order to calculate power requirements for future planning purposes and the like. Engineers and other groups such as material management groups, often need accurate data at a more detailed level than provided by conventional methods.

Further, when interchangeable pieces of equipment are swapped out of equipment racks, interested parties need to know the details of the swap. Similarly, when planning rackface configurations to maximize both network traffic flow and floor space utilization, planners need to know the details of the components down through the rack, shelf and module level. In addition, site planners need to know when rack components are brought on-line. This information is required for power equipment in addition to transmission equipment. Further, it is would be very useful for site engineers to know exactly when installed equipment becomes decommissioned. This would allow much greater flexibility for future planning of remote sites.

Power engineers and site planners must insure that adequate primary or off-site power is supplied to a site and that adequate back-up or reserve power is available for a site in the event that scheduled or unscheduled interruptions to off-site power occur. Power engineers and site planner thus must be able to ascertain site power requirements in order to insure that adequate off-site and reserve power is available for that site.

Thus, a system and method is desired in which power data can be quickly and easily input to a database from a remote location, thus insuring that the database accurately reflects existing conditions at a site. Such a system and method should also be able to calculate reserve supply times and other information for a site.

SUMMARY OF THE INVENTION

The present invention is directed to a system and method for remotely inputting power data for consumer equipment into a database and for calculating reserve power times for the consumer equipment. The system and method is referred to herein as a Power Page system and method.

In a preferred embodiment, the system is an integral part of a comprehensive site planning facility and interfaces with a permanent site facility database and a temporary relational database. Both databases store data relating to sites, power plants associated with sites and component data related to power plants. Power plants are battery-based electrical systems for buffering street power and for providing automatic reserve power for consumer equipment, such as telecommunications site equipment. Power plants may include AC and DC power plants.

Preferably, the system precludes the existence of a single site in both the site facility planning database and the temporary relational database. In addition, where power plant data is stored in the temporary relational database, the data can preferably be incorporated, automatically or manually, into the site facility planning database. Thus, the temporary relational database can be used to store temporary records for later incorporation into a site facility database. Data stored in the site facility planning database is thus secure from Power Page users.

The system includes a data input module for receiving power plant data from a remote user and for inputting power plant data into a database. The data input module permits users to add, modify and remove power plant data associated with sites which are stored in the temporary relational database. The data input module also permits users to edit consumer equipment load values associated with power plants, regardless of whether data for associated sites are maintained in the site facility planning database or the temporary relational database.

A calculation module retrieves data from the database and calculates reserve times for which power plants can supply power to consumer equipment. As a precautionary measure, the calculation module preferably employs correction factors which exaggerate consumer equipment loads and underestimate power plant reserve time.

In a preferred embodiment, the system is implemented using a web browser such as Microsoft Internet Explorer or Netscape Navigator. Thus the system may be accessed from and computer which runs a browser and is connected to a company-wide intranet, or the like.

In an alternative embodiment, the system implemented is a stand-alone system in which only the temporary relational database is employed.

Further features and advantages of the present invention, as well as the structure and operation of various embodiments of the present invention, are described in detail below with reference to the accompanying drawings.

BRIEF DESCRIPTION OF THE FIGURES

The present invention will be described with reference to the accompanying figures, wherein:

FIG. 3B is a representation of the relationship between FIGS. 3C–3K and FIG. 7;

FIG. 15 is a print-out of a web-page screen for accessing a logon screen for a Power Page system;

FIG. 16 is a print-out of a web-page screen for logging on to a Power Page system;

FIG. 18 is a print-out of a web-page screen for adding new plant records to a database;

FIG. 21 is a print-out of a web-page screen for adding, deleting and editing battery data associated with a plant;

FIG. 23 is a print-out of a web-page screen for adding, deleting and editing rectifier data associated with a plant;

FIG. 24B is a print-out of a web-page screen for adding, deleting and editing generator data associated with consumer equipment;

FIG. 28 is a print-out of a web-page screen for calculating reserve times for hypothetical power plants and loads;

FIG. 29 is a print-out of a web-page screen for calculating reserve times for hypothetical power plants and loads; and FIG. 30 is a print-out of a web-page help screen for a Power Page system.

In the figures, the reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

OVERVIEW

The present invention is directed toward a web-based system and method for remotely inputting power plant data into a database and for calculating reserve times for which power plants can supply power to consumer equipment. In a preferred embodiment, the invention is integrated with a comprehensive site facilities planner. In an alternative embodiment, the system is implemented as a stand-alone system.

Briefly, a site facility planner can be described as a system and method for recording, maintaining and viewing data related to the configuration, installation and placement of equipment within remote field sites, such as telecommunication field sites. A preferred system for incorporation with the present invention is best described in terms of an example embodiment. Specifically, a site facility planner is best described in terms of an application program comprising all of the features described below, referred to as "SiteVu". In this example, SiteVu is used to record, maintain and view the configuration and placement of equipment in field sites for a telecommunications service provider. The description in such terms is provided for convenience only. It is not intended that the invention be limited to this example embodiment. For example, the present invention can be used to support other types of equipment for industries other than the telecommunications industry. In fact, after reading the following description, it will become apparent to persons skilled in the relevant art(s) how the implement the present invention in alternative embodiments.

Figure 1A:
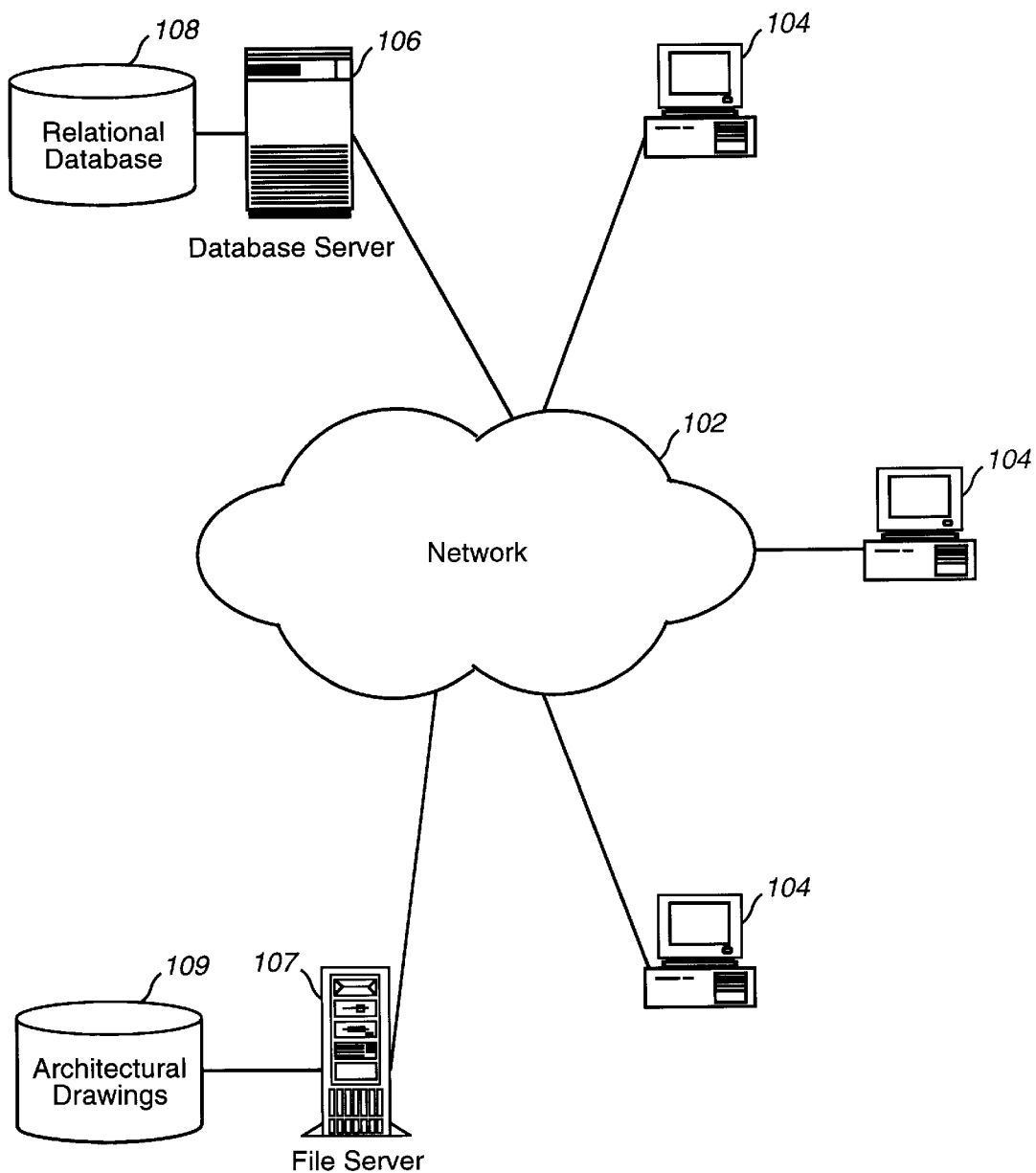
FIG. 1A is a block diagram depicting an operational environment according to a preferred embodiment of the present invention.

FIG. 1A is a block diagram depicting a typical operational environment of a facilities planner. A network 102 is depicted in the center of the drawing in FIG. 1A. The network 102 represents any type of computer and/or telecommunications network or combination thereof, that can be used to couple a plurality of workstations 104 with a relational database 108. In this example, each workstation 104, is a general purpose computer system that executes software (referred to herein as "SiteVu"), that causes the computer system 104 to perform the functions as described herein.

In one embodiment of the present invention, the network 102 can be a company wide intranet. In other embodiments, local area networks (LANs), or wide area networks(WANs), (such as multiple LANs linked together with bridges, routers or the like), can be used as the network 102. In addition, the network 102 can include the use of switched networks, and other forms of common carrier transmission lines and equipment that can link remote computers, such as the remote workstations 104, to the relational database 108.

Also depicted in the example environment shown in FIG. 1A is file server 112 and a storage device comprising architectural drawings 110. In a preferred embodiment, each computer system 104 executes software that performs computer aided drafting and design (CADD) functions. Preferably, the CADD software is controlled by the SiteVu program. In this example, architectural drawings may be stored on local storage devices in each of the workstations 104, or in a central file server, such as the file server 112.

In this example the relational database 108 is coupled with a database server 106. In a preferred embodiment, the relational database is implemented using an Oracle relational database, supplied by Oracle Corporation. In addition, the database server 106 is a DEC Alpha 2100, manufactured by Digital Equipment Corporation. Further, Microsoft Windows®, manufactured by Microsoft Corporation can be used as the operating system for the computer systems 104 used to execute the SiteVu and the CADD programs. Finally, in a preferred embodiment, the CADD program used is Microstation CADD, manufactured by Bently Systems, Inc.

FIGS. 1B–1H depicts an example of an architecture of the SiteVu program. Specifically, FIGS. 1B–1G describe an example of SiteVu components and their associated inputs and outputs.

Figure 1B:
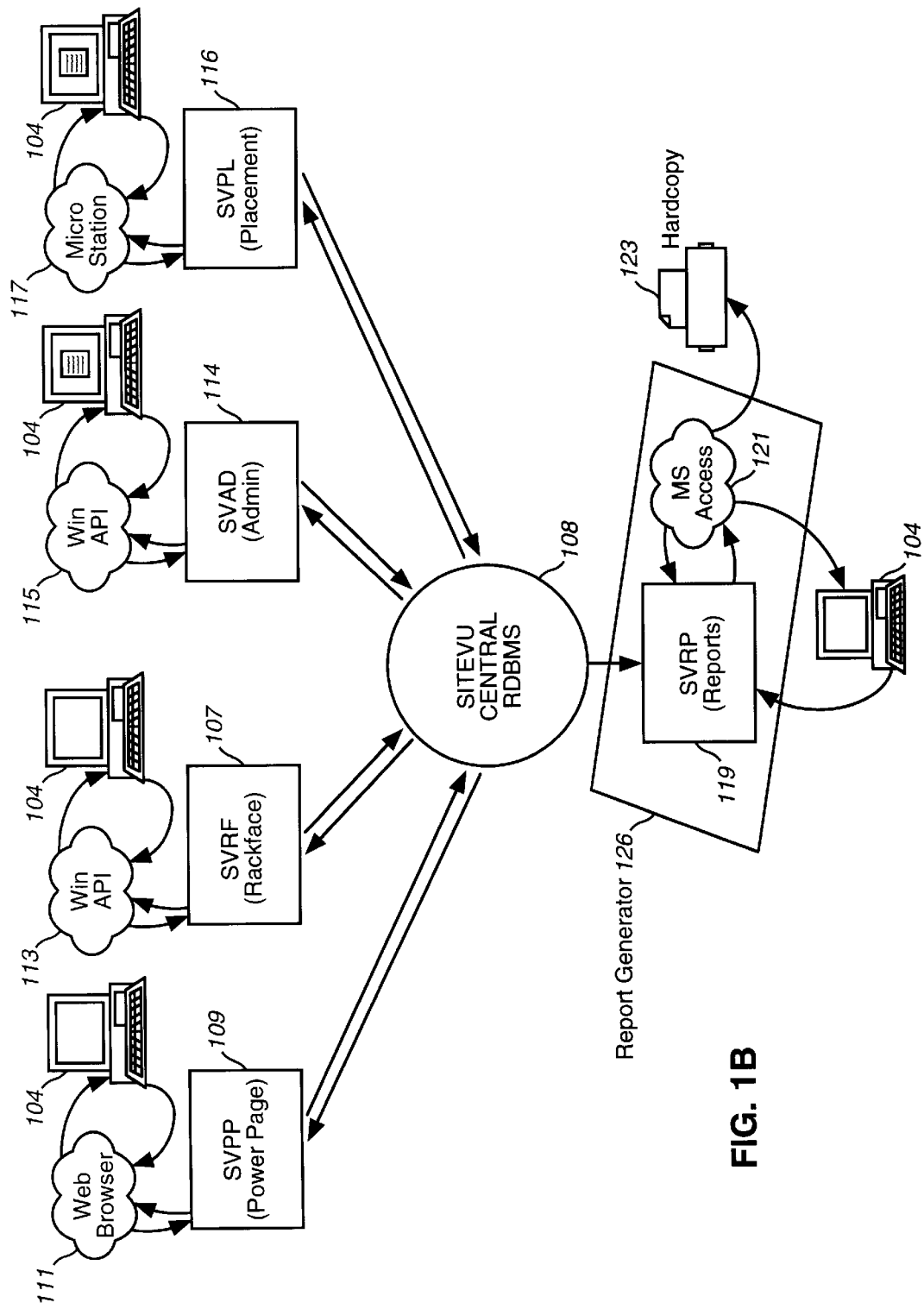
FIG. 1B is a block diagram depicting a modules of a site facility planner according to a preferred embodiment of the present invention.
Figure 1C:
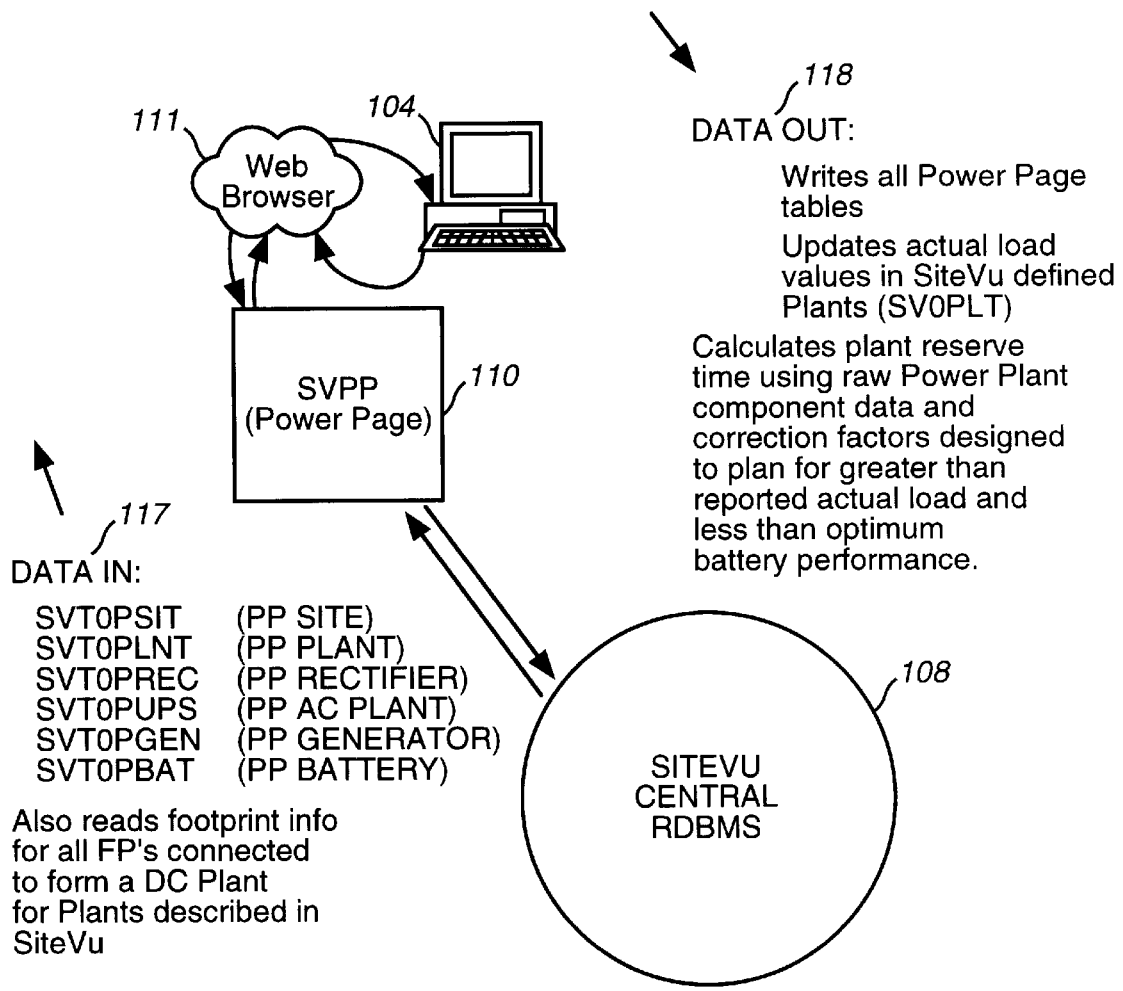
FIGS. 1C–1G each contain a block diagram depicting individual modules of the site facility planner depicted in FIG. 1B.
Figure 1D:
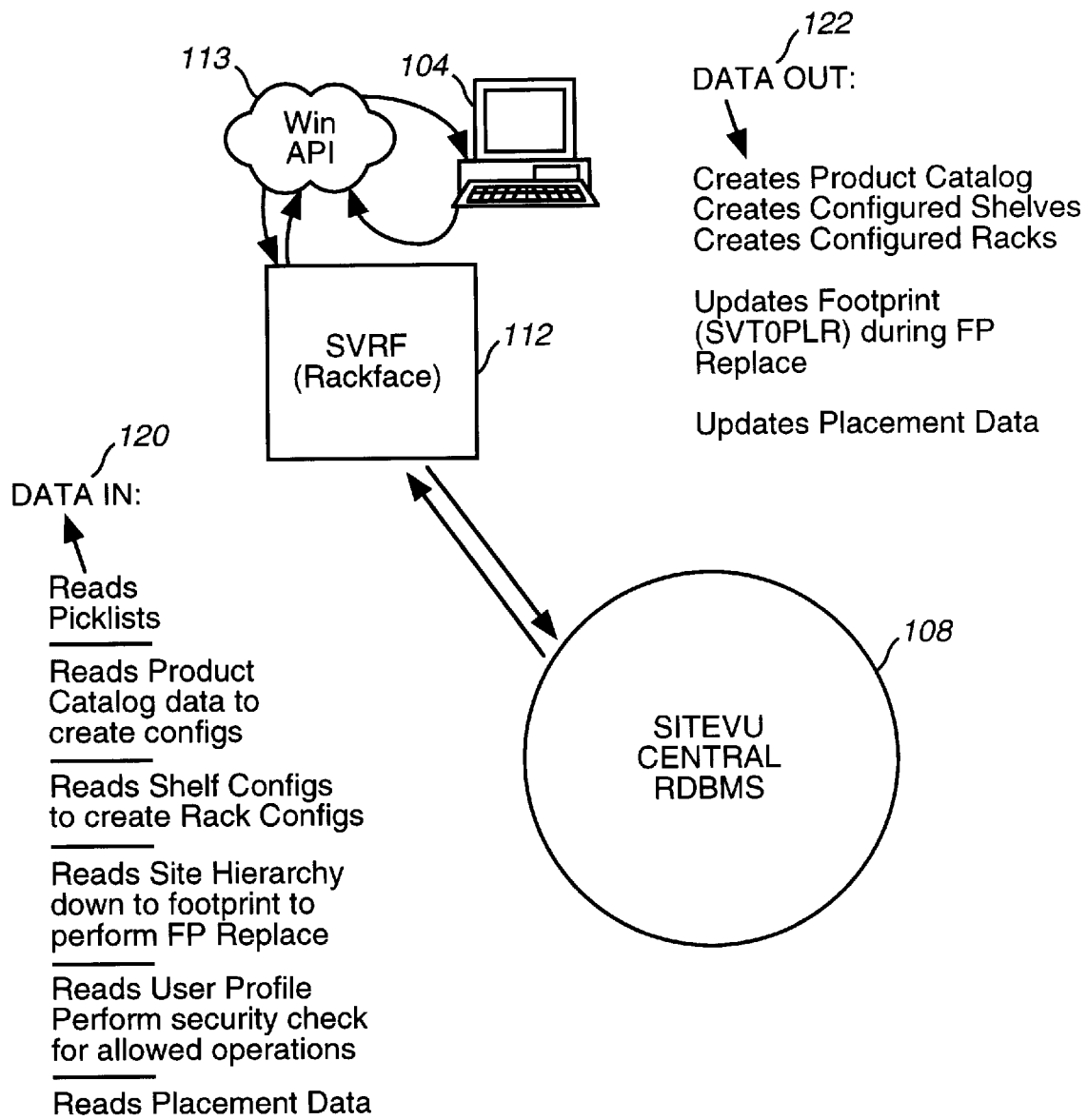
Figure 1E:
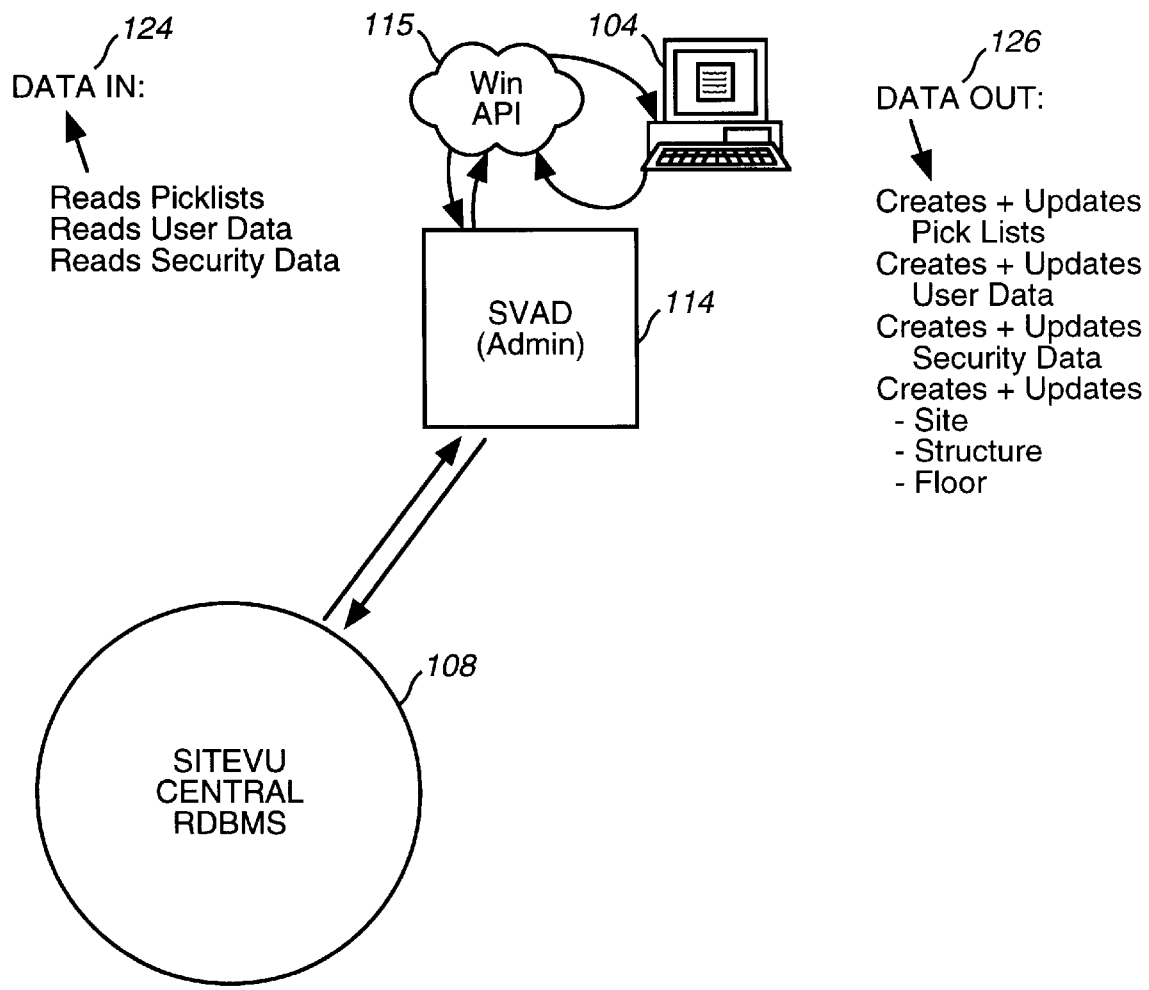
Figure 1F:
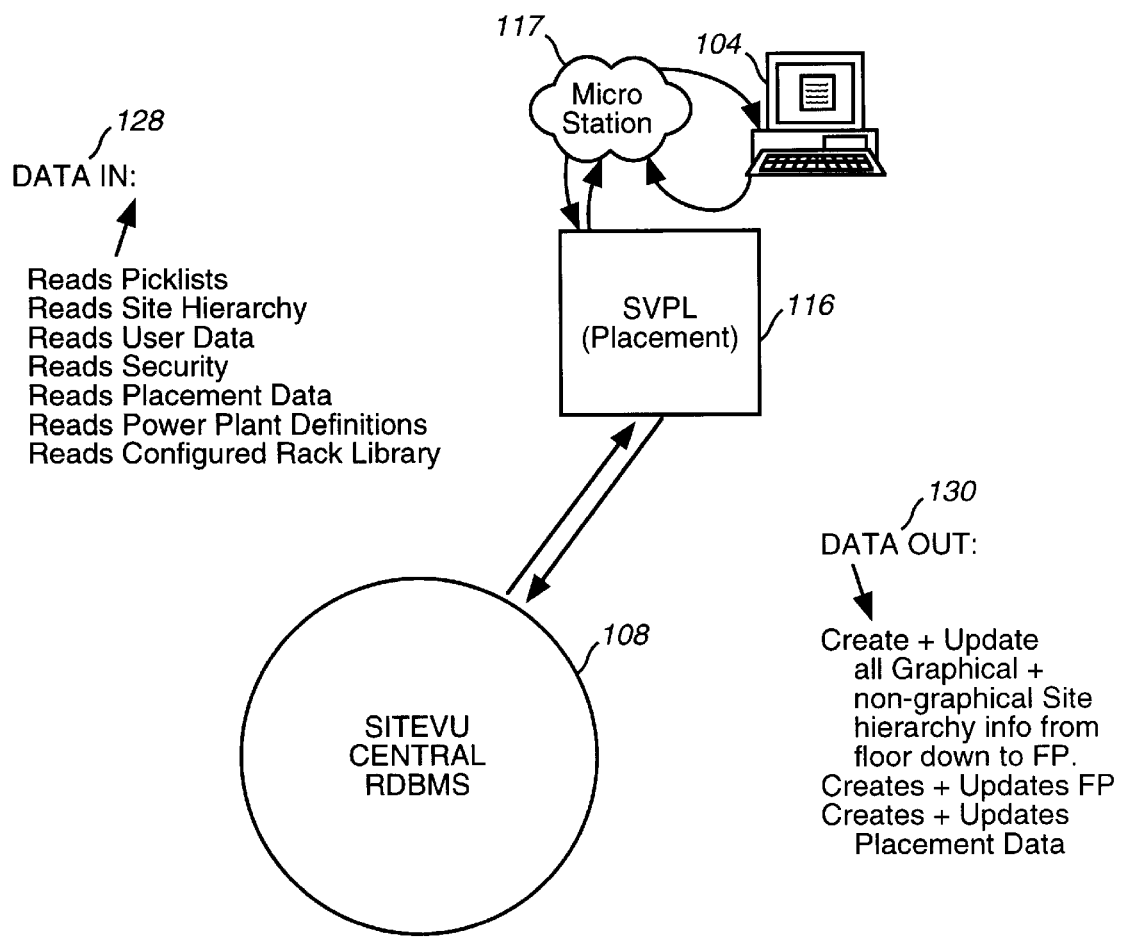
Figure 1G:
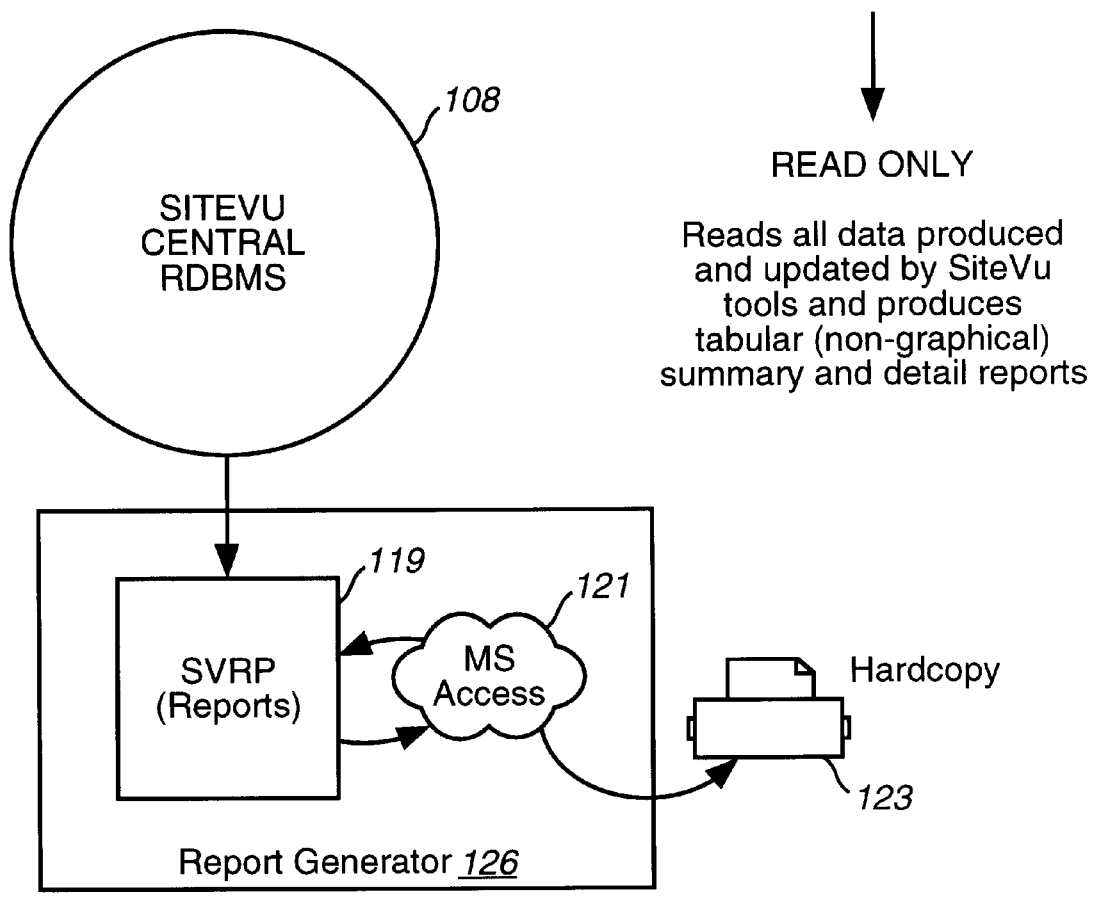
Figure 1H:
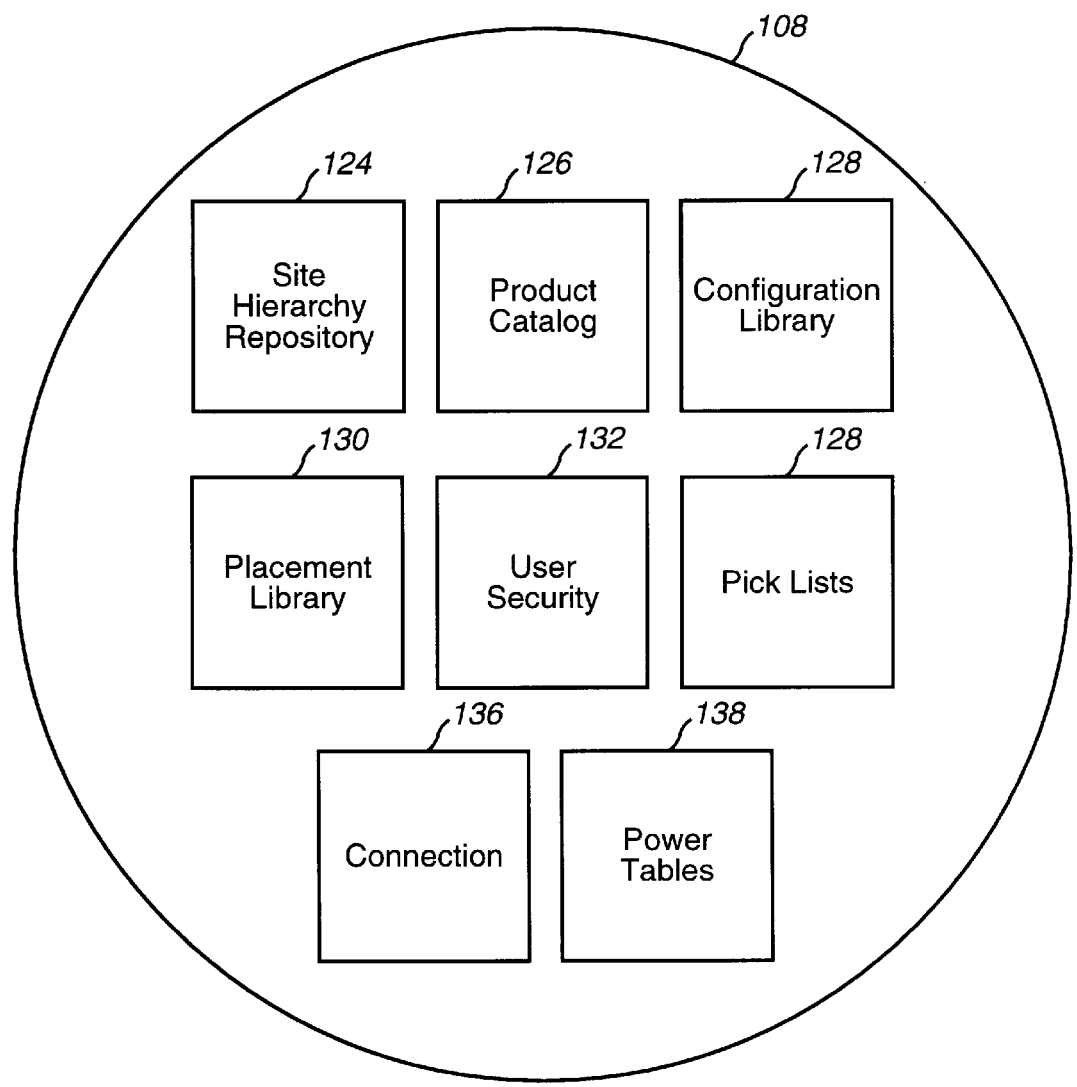
FIG. 1H is a block diagram depicting individual libraries of a relational database.

FIG. 1H depicts the logical components of the database 108. Specifically, in this example, the database 108 comprises: a site hierarchy repository 124; a product catalog 126; a configuration library 128; a placement library 130; user security 132; pick lists 134; connections 136; and power tables 138. A more detailed description of the database 108, illustrating specific tables and relationships between tables, is subsequently described below with reference to FIG. 3.

As indicated by FIG. 1B, the SiteVu central database 108 is preferably, a relational database management system. The SiteVu tool (FIG. 1B) comprises the following components: a SiteVu Power Page (SVPP) 109; a SiteVu Rackface tool (SVRF) 107; a SiteVu Administrative tool (SVAD) 114; a SiteVu Placement tool (SVPL) 116, and a SiteVu Report Generator 140.

As indicated by FIG. 1B, Power Page 109 reads data from and stores data in the database 108. Power Page 109 provides power estimates for remote sites. In a preferred embodiment, a web browser 111 is used to input data into Power Page 109 from the workstation 104, and to output data from Power Page 109 to the workstation 104.

The rackface tool 107 reads data from and stores data in the database 108. The rackface tool 107 is used to define components for the product catalog 126. Further, the rackface tool 107 is used to define configured shelves using empty shelves and modules from the product catalog 126, and storing the configured shelves in the configuration library 128. In addition, the rackface tool 107 is used to define configured racks from rails and configured shelves from the product catalog 126 and the configuration library 128, respectively. Such configured racks (also referred to as racks), are stored in the configuration library.

In addition, the rackface tool 107 is used to operate on footprints. As stated footprints are racks that have been placed in remote sites, via the placement tool 116 (described below). Specifically, in a preferred embodiment, the rackface tool 107 is used to display information about footprints and to replace one footprint with another footprint.

Similarly, the Administration tool 114 reads data from and stores data to the database 108. The Administration tool 114 is used to create and update the pick lists 134, user security data 132, and portions of the site hierarchy repository 124. In a preferred embodiment, the Administration tool 114 is implemented using the Windows® operating system, provided by Microsoft, Inc. Thus, Window's® Application Programming Interface 115 is used to implement the functions provided by the administration tool 114 on the workstation 104.

The Placement Tool 116 reads data from and stores data to the database 108. Specifically, the Placement tool 116 is used to create footprints by placing racks in remote sites. Such data is stored in the placement library 130. In a preferred embodiment, the placement tool 116 is also implemented using the Windows® operating system, provided by Microsoft, Inc. In addition, graphics are provided by a CAD program, such as Microstation CAD 117, as previously described.

The report generator 119 reads data from the database 108 to generate reports. In a preferred embodiment the report generator is implemented using Access 121, provided by Microsoft, Inc. Reports are printed on the printer 123.

Power Page 109 is coupled to database 108 for inputting power data into database 108, including plant data and consumer equipment load data and for calculating reserve times and other data for plants. Power page 109 receives power data and commands from users at workstations, or remote terminals, 104, preferably via a web browser interface 111.

In a preferred embodiment, Power Page 109 is an integral part of a comprehensive Site View planning facility in which database 108 includes power tables 138 for storing temporary data for plants and consumer equipment. Non-temporary data for plants and consumer equipment are input to a configuration library 128 of database 108 via the placement tool 116. Preferably, consumer equipment data and plant data are associated with footprint data.

In the preferred embodiment, Power Page users may edit non-temporary consumer equipment load data and calculate reserve times. In addition, Power Page users can add, edit and delete data in the power tables and calculate reserve times for plants in the power tables.

Thus, in the preferred embodiment, data stored in power tables 138 is intended to reflect as-built conditions at a site only if data for the site has not yet been entered into a main portion of database 108 by placement tool 116, for example. While the data is in power tables, it can be changed by Power Page users, as necessary. Preferably, once site planners enter this data into a main portion of database 108, Power Page users can no longer alter the data, with the exception of consumer equipment load values. These values may be changed by Power Page users, as necessary, to reflect actual load conditions at a site.

FIG. 1C depicts Power Page 109 in greater detail. Power page 109 receives power data, including plant data and consumer equipment load data from users at workstations or remote terminals 104. Power page 109 sends this data, shown here as data_in 117, to a Power Page database 138 for storage. Data-in 117 may include consumer equipment data, plant data, rectifier data, battery data, generator data and UPS or inverter data. Preferably, database 108 stores data-in 117 in a relational database.

In the alternative embodiment, users at workstations 104 may select, via web browser 111, to add, delete or edit power data stored in database 108. Users may also instruct Power Page 109 to calculate the adequacy of power supplies for a particular site load. Preferably, Power Page 109 can calculate a reserve time for which a particular battery plant can sustain a specified consumer equipment load. In addition, Power Page 109 preferably determines whether additional rectifiers are required for a plant.

FIG. 1D depicts various types of data used by rackface tool 107. As indicated by the data-in list 120, the rackface tool 107 reads pick lists 134 from the database 108. A pick list is a database table that comprises a list of valid values for particular data fields within the database 108. Preferably, pick list tables are used during a data entry process to provide users with a drop-down list box, or the like, comprising textual representations of pre-defined values that can be specified for particular data fields. Note that the term "pick list" is used herein to describe a pick list table in the database 108. However, the term is also used herein to describe the drop-down list box that is associated with a pick list table and used during a data entry process.

In addition, the rackface tool 107 reads data from the product catalog 126 to create shelf configurations that are stored in the configuration library 128. Further, configured shelf data from the configuration library 128 is used to create rack configurations that are also stored in the configuration library 128. Site hierarchy data is read from the site hierarchy repository 124 and is used to replace generic footprints with manufacture specific footprints. Further, placement data is read from the placement library and used to display footprint information, and replace generic and manufacturer specific footprints.

User and security data 132 is read by the rack face tool to determine access rights and the like for particular users. In addition, placement data is read from the placement library 130 when the rackface tool 107 replaces generic footprints.

Examples of data output from the rackface tool 107, as indicated by the data out list 122, includes product catalog data, configured shelves data and configured rack data. For example, the rackface tool 107 is used to create components in the product catalog 126.

Similarly, the rackface tool 107 is used to create entries in the configuration library 128.

Another example of data output from the rackface tool 107, includes data used to update the placement library 130 when a generic footprint is replaced with a manufactures specific footprint.

FIG. 1E depicts various types of data which may be used by Administrative tool (SVAD) 114. As indicated by the data-in list 120, the Administrative tool 114 reads pick lists 134 and user and security data 132 from the database 108.

As indicated by the data-out list 126, the administrative tool 114 creates and updates pick lists 134 and user data and security data 132. In addition, this tool is used to create part of the site hierarchy, stored in the site hierarchy repository 124. Specifically, the sites, buildings (or structures) and the non-graphical portion of the floor level hierarchies are created by the administrative tool 114.

As indicated by FIG. 1F, the placement tool 116 reads data from and stores data to the database 108. Specifically, the Placement tool 116 is used to create footprints (i.e., an equipment placed on the floor space) by placing racks in remote sites. Such data is stored in the placement library 130. In a preferred embodiment, the placement tool 116 is also implemented using the Windows® operating system, provided by Microsoft, Inc. In addition, graphics are provided by a CADD program, such as Microstation CADD 117, as previously described.

FIG. 1F depicts various types of data used by placement tool 116. As indicated by the data-in list 128, the placement tool reads pick lists 134, user and security data 132, site hierarchy data 124, placement data 130, configured rack data 128, and power plant definition data 138 from the database 108.

As indicated by the data-out list 130, the placement tool 116 uses a site hierarchy (i.e., from a site down to a floor) established by the administrative tool 114 to create graphical and database representations of remote sites, buildings, floors, zones, rows (specifically row segments), and footprints. The tool can also be used to update these objects, both graphically and the data associated therewith. Therefore, the tool can be used to update site hierarchy data 124, configuration data 128, pick list data 134, and placement data 130.

FIG. 1G depicts report generator 124 coupled between database 108, workstations 104, and printer device 123 for generating reports. Report generator 124 includes a local or temporary relational database and report organizer 121 and a SVRP report generator 119. Users at workstations 104 are presented with a suite of pre-defined reports. Upon selection of a report by a user, SVRP report generator module 119 generates an appropriate query to database 108. Query results are placed in local relational database and report organizer 121 where the data is rearranged into relational tables, as necessary.

SVPR report generator 119 instructs local relational database and report organizer 121 as to how to process the locally stored data and how to organize the results into a tabular format. Reports are then output to printer device 123 or workstations 104. In a preferred embodiment, relational databases and report organizer 121 includes a report generator application such as, for example, Microsoft Access or Crystal Reports.

Figure 2:
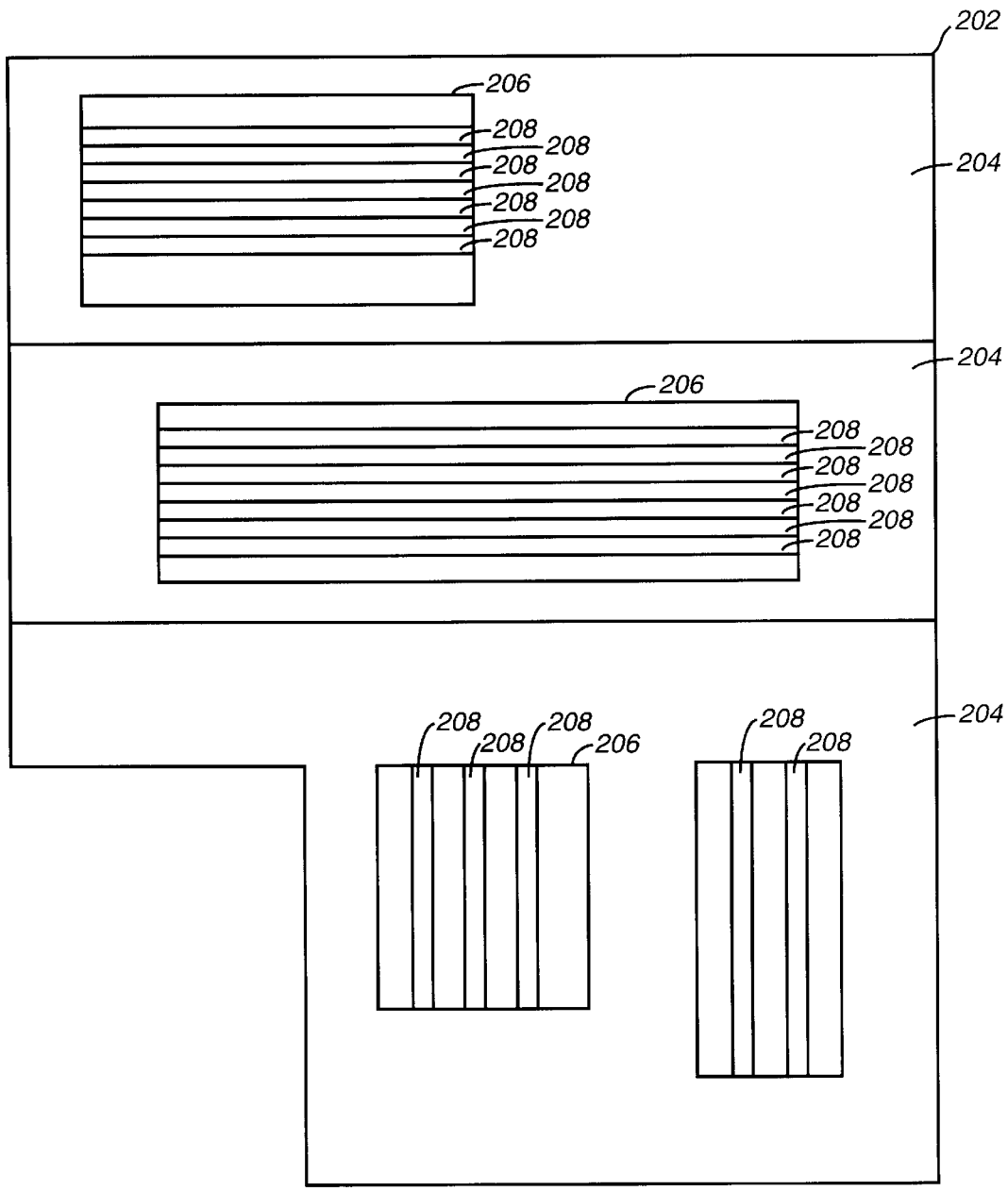
FIG. 2 is a representation of planning units within zones, as employed by the site facility planner depicted in FIG. 1B.

FIG. 2 is a block diagram that graphically illustrates an example of a site hierarchy. Specifically, the site hierarchy shown in FIG. 2 comprises a floor 202, 3 zones 204, 4 planning units 206 and a plurality of rows 208 within each planning unit 206. Each site hierarchy level shown in FIG. 2 is represented by a polygonal shape that completely encloses the lower hierarchy levels that are contained therein.

In this example of a preferred embodiment, zones typically represent physical locations in which equipment of a particular class are placed. In a preferred embodiment, racks cannot be placed unless the equipment class of the rack matches the equipment class of the zone in which the rack is being placed. In one embodiment, this function is supported by the placement tool 112.

In this example, planning units 206 are specified so that multiple users can define rows 208, in the same zone 204, at the same time. In a preferred embodiment, the database 108 is shared by multiple users. However, in order to maintain data integrity, certain precautions must be taken. In this example, when a user is in the process of defining rows and placing equipment, other users are prevented from accessing certain portions of site hierarchy repository 124. In particular, the site hierarchy level just above the row level being defined must be locked. Thus, a site hierarchy level of planning unit 206 is used between the row level 208 and zone level 204. Accordingly, planning unit 206 is locked from other users instead of the zone level 204. In this manner, several users can work simultaneously to define rows 208 within the same zone 204.

In a preferred embodiment, a site hierarchy level called a row segment, is used to prevent users from placing racks in areas that have physical obstructions. A physical row in a site may include one or more row segments. In the simple example shown in FIG. 2, there is a one to one correspondence between physical rows 208 and row segments. Footprints can only be created in row segments. For example, suppose a physical obstruction, such as a building support column, is present within a particular row 208 in a field site. In this case, the physical row 208 includes two row segments, that are placed to avoid the obstruction. In this fashion, since racks can only be placed within row segments, a user cannot inadvertently place a rack in the same position as the obstruction.

An implementation of the present invention provides a means for defining components, including modules, shelves and rails, that are stored in the product catalog 126. Preferably, detailed information pertaining to each component within the product catalog 126 is defined during a data entry process.

Figure 3A:
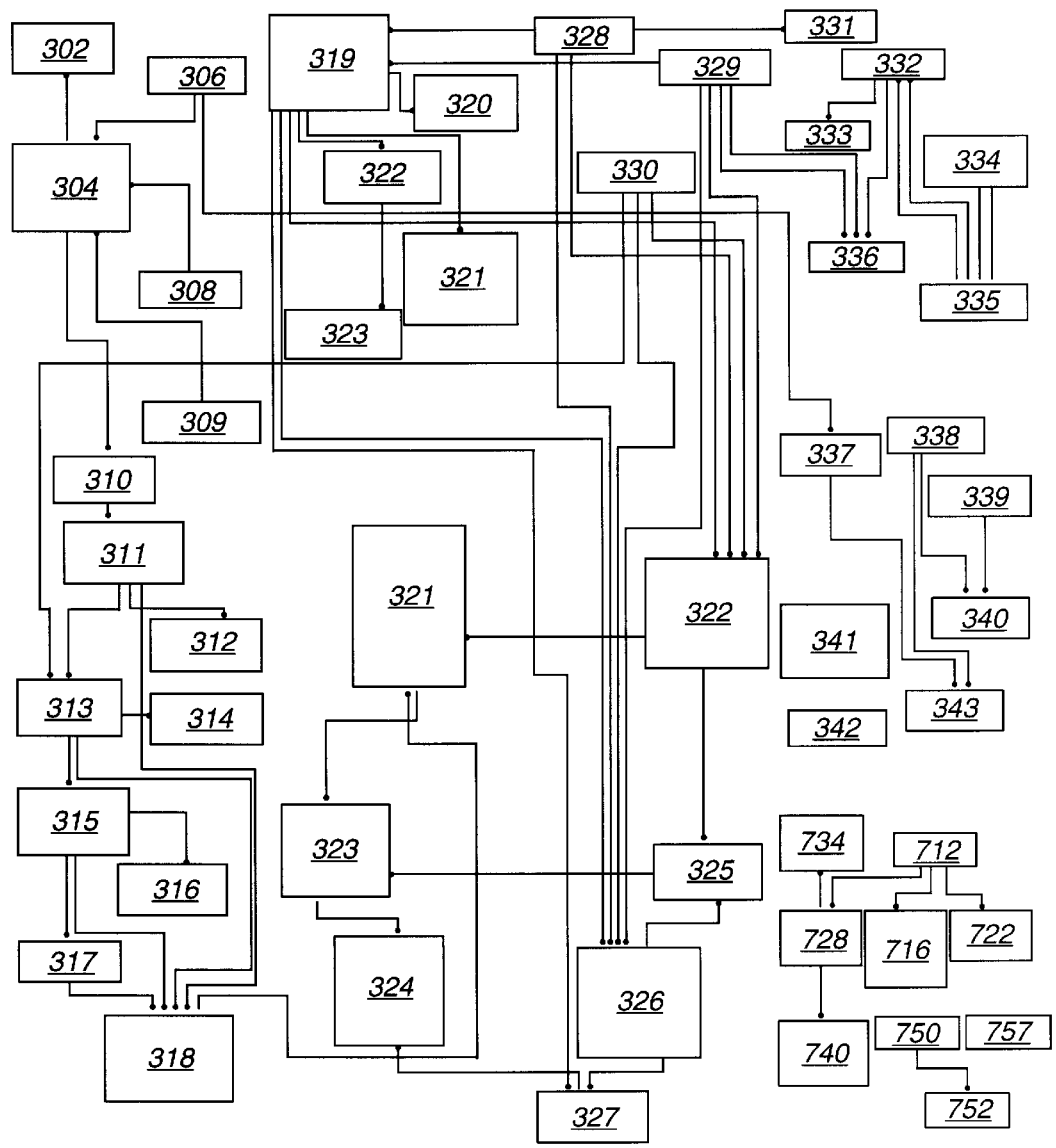
FIG. 3A is a representation of a high-level view of a preferred relational database employed by the site facility planner depicted in FIG. 1B.

FIG. 3A is a block diagram illustrating a plurality of database tables that can be used to implement the database 108. In this example, a relational database is used to implement the database 108. However, in other embodiments, different types of databases can be used. An expanded version of the block diagram depicted in FIG. 3A is also depicted in the FIGS. 3C–3M and 7. FIG. 3B shows how the FIGS. 3C–3M and 7 are related to each other to form the block diagram depicted in FIG. 3A.

Figure 3C:
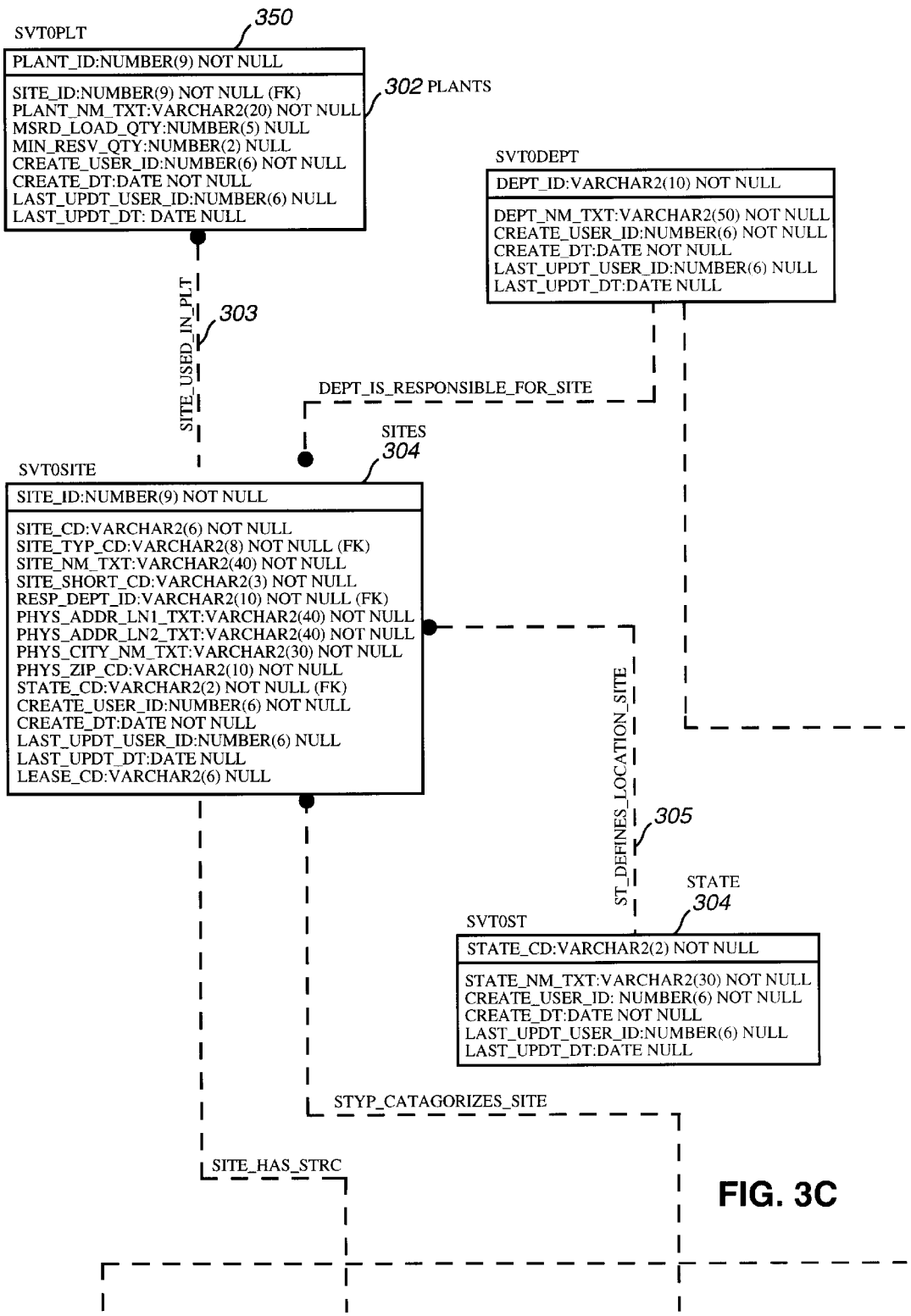
FIGS. 3C–3M each contain a representation of a portion the relational database illustrated in FIG. 3A.

Referring now to FIG. 3C, the table 304 represents remote sites in a portion of the database 108, referred to above as the site hierarchy repository. Each box, such as the box 304, represents a specific database table. Accordingly, each database table comprises the names of specific data fields that are defined for each table according to a preferred embodiment of the present invention.

In this example, the names for each data field are descriptive of the type of data they represent. For example, the first three data fields in the site table 304 are named "SITE_ID", SITE_CD and SITE_TYP_CD", respectively. These three data fields hold information related to a site identification number, a site code and a site-type code, for each site stored in the site table 304. As such, for the most part, by reading the descriptive names of the data fields illustrated in FIGS. 3C–3M and 7, their function and purpose would be apparent to those skilled in the relevant arts.

Typically, data fields in a relational database 108, are conceptualized as columns in a database table. Likewise, the data stored therein are conceptualized as rows in a database table. Thus, the term row is used herein to describe a single data entry within a database table. Accordingly, the term row and the term entry are synonymous. For example, a single row (or entry) in the site database table 304, represents data describing the details of a single remote site. A complete description of the remote site comprises specific values for each of the data fields associated with the database table 304. However, it is generally not necessary to provide values for every data field associated with a database table. This choice generally depends on each specific implementation of the present invention, which will typically will define data fields as being either required or optional.

The lines interconnecting database tables shown in FIGS. 3C–3M and 7 represent relationships among tables. It should be noted that for the most part, the database tables shown in FIGS. 3C–3M and 7 are self-explanatory to those skilled in the relevant art(s). Accordingly, after reading the brief description below and examining FIGS. 3C–3M and 7, it would be apparent to those skilled in the relevant art(s) how to implement the database 108, according to a preferred embodiment of the present invention.

Interconnecting database tables shown in FIGS. 3C–3M and 7 represent relationships among the tables in the database 108. For example, a line 303 is shown connecting the site table 304 to the plant table 306. In this example the plant table 302 represents power plants that are installed in each site. The circle at the end of the line 303 represents a one to many relationship between the rows in the site table 304 and the rows in the plant table 306. Accordingly, each entry in the site table 304 may be associated with more than one entry in the plant table 306. In other words, each site may have more than one plant installed therein.

The tables 306 and 308 represents pick list tables for specific data fields within the site table 304. Specifically, the pick list tables 306 are associated with data fields used to define a responsible department and a geographical state for a particular site listed in the table 304.

In this example, pick list tables comprise a list of valid values that are used to fill-in particular data fields. A pick list table, such as the pick list table 308, is used to assist in the data entry process. Typically, a pick list table is associated with one or more data fields. For example, the pick list table 308 is associated with a data field "STATE-CD" within the table 304 (as depicted by the dotted line 305). Preferably, pick list tables are used during data entry to provide users with a drop-down list box, or the like, comprising textual representations of pre-defined values that can be specified for the row or rows, associated with the pick list table.

Accordingly, using the example described above, a pick list comprising states containing remote sites is presented to the user during a data entry phase. Preferably, after the user selects an item from the pick list (in this case the name of a state), the associated value is automatically entered stored in the associated row within the database table. Typically, in such cases, users are restricted to values contained in the pick list tables. That is, for such data fields that have pick lists associated with them, values other than those contained in the pick list may be considered invalid. However, this choice depends on particular implementations of the present invention.

Figure 3D:
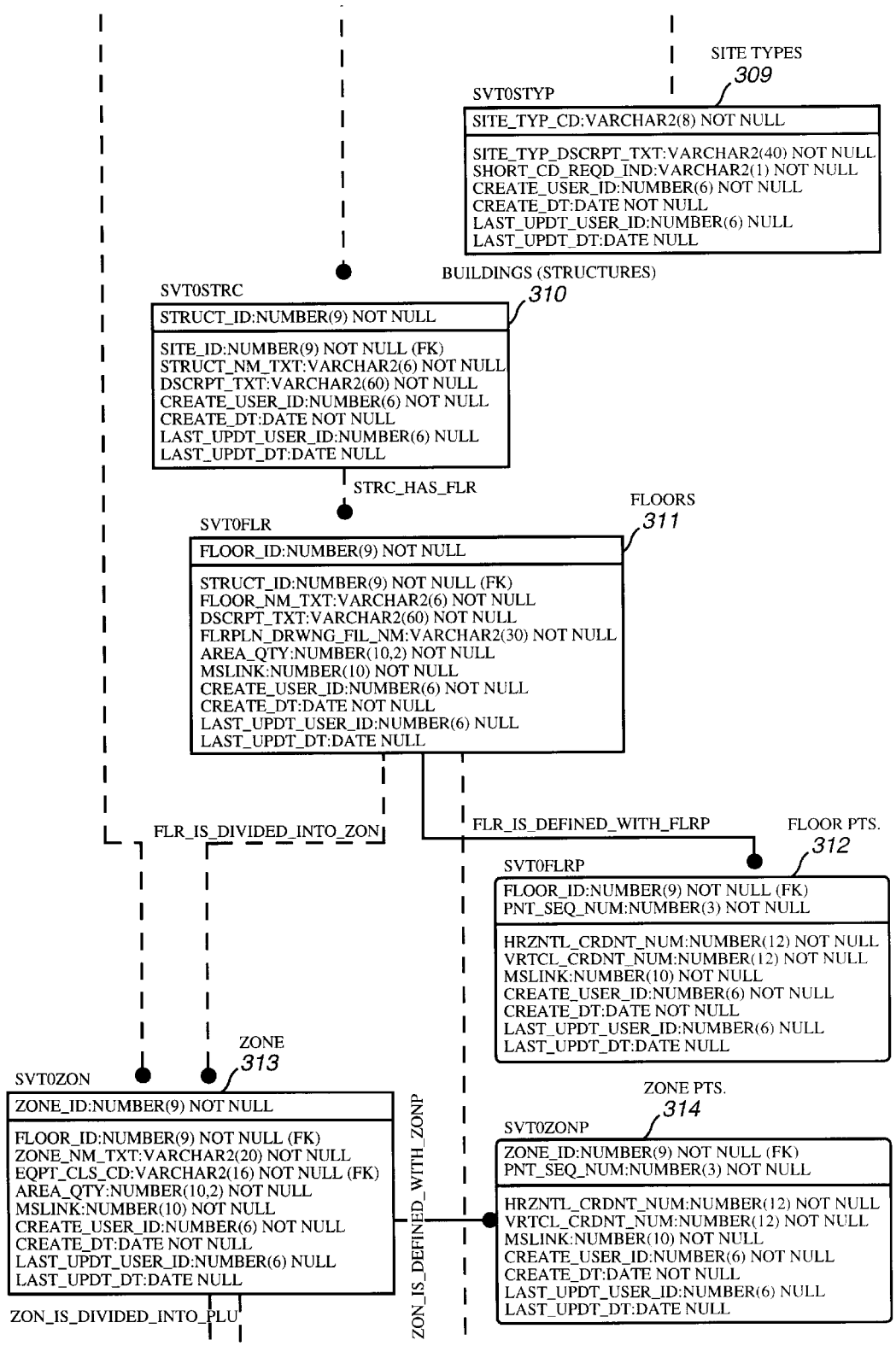

Referring now to FIG. 3D, table 309 is a pick list table associated with the site table 304 for providing valid values for the data field used to store site types. Table 310 represents structures or buildings within sites. Typically, each site (represented by a single entry or row in the site table 304), comprises multiple buildings that are each represented by a single entry in the building table 310. Therefore, typically the building table 310 comprises multiple rows for each row in the site table 304.

The table 311 represents floors within structures represented by table 310. Typically, the floor table 311 comprises multiple entries for each entry in the structure table 310. The table 312 represents floor points for the floors represented by the floor table 310. This information is used in a preferred embodiment of the present invention for rendering graphical representations of floors, as described above. In one embodiment, each entry in the floor point table 312 contains x-y coordinates for a portion of a polygon that is used to graphically represent the associated floor. Typically, the floor point table 312 comprises multiple rows for each entry in the floor table 311.

The table 313 represents zones within floors represented by the floor table 311. Typically, the zone table 312 comprises multiple entries for each entry in the floor table 311. The table 314 represents zone points for the zones represented by the zone table 313. This information is used in a preferred embodiment of the present invention for rendering graphical representations of zones. In one embodiment, each row in the zone point table 314 contains x-y coordinates for a portion of a polygon that is used to graphically represent the associated zone. Typically, the zone point table 314 comprises multiple entries for each entry in the zone table 313.

Figure 3E:
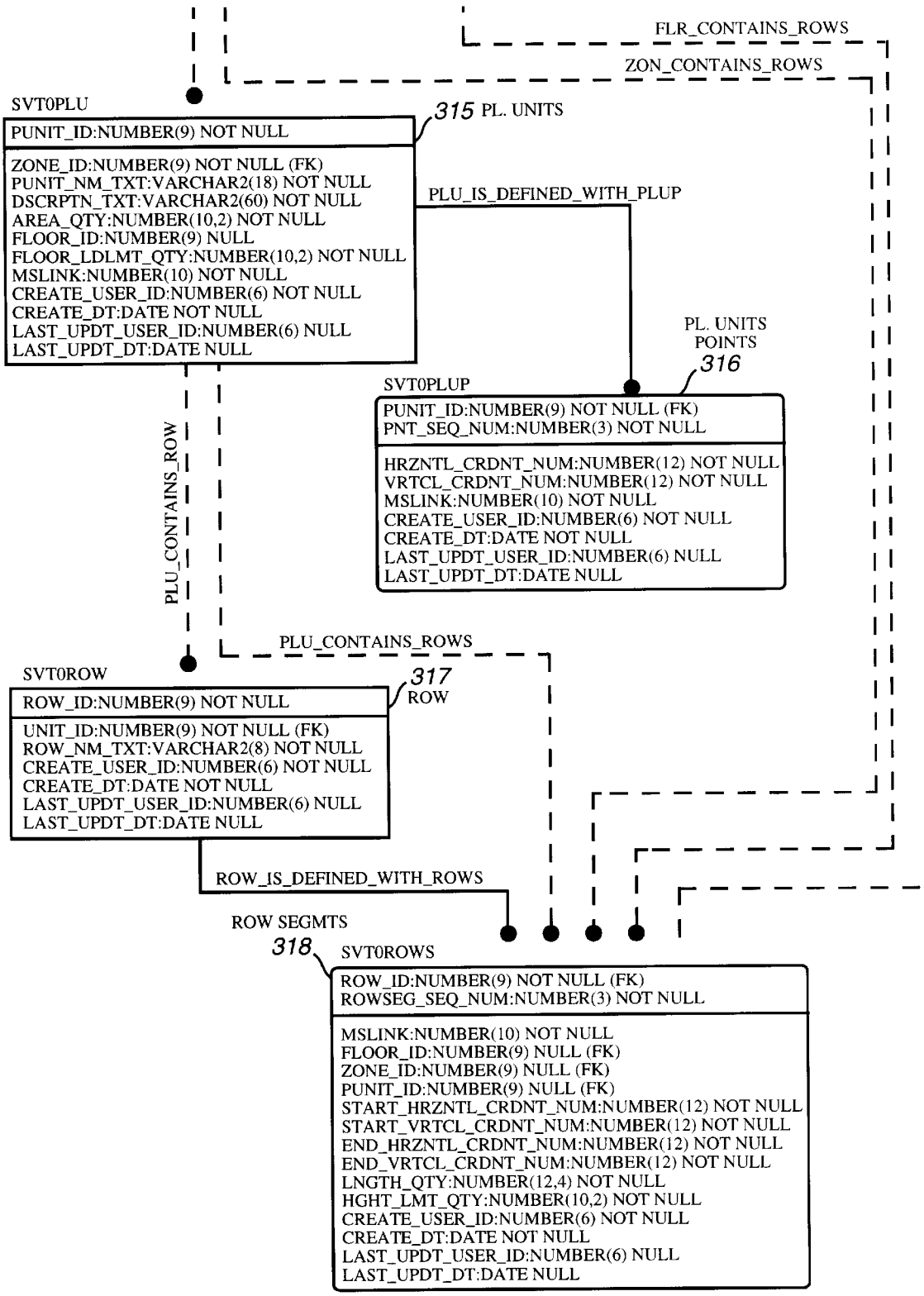

Referring now to FIG. 3E, the table 315 represents planning units within zones represented by the zone table 313. Typically, the planning unit table 315 comprises multiple entries for each entry in the zone table 313. The table 316 represents points for planning unit table 315. This information is typically used for rendering graphical representations of planning units. In one embodiment, each row in the planning unit point table 316 contains x-y coordinates for a portion of a polygon that is used to graphically represent the associated planning unit. Typically, the planning unit point table 316 comprises multiple entries for each entry in the planning unit table 315.

The table 317 represents rows within planning units. Typically, the row table 317 comprises multiple entries for each entry in the planning unit table 315. The table 318 represents row segments within rows. Typically, the row segment table 318 comprises multiple entries for each entry in the row table 317. As will be shown below, configured racks are placed within row segments.

Figure 3F:
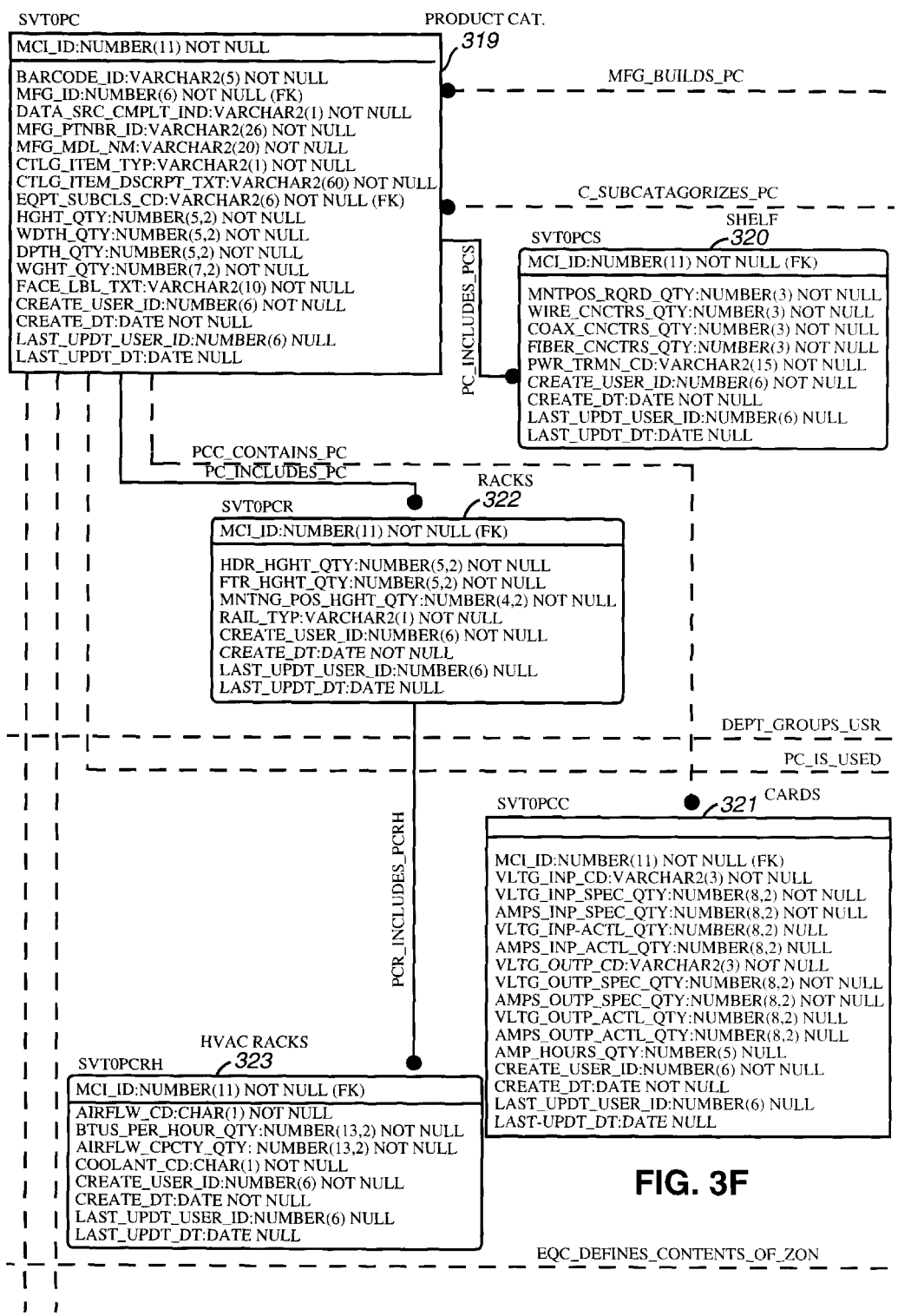
Figure 3G:
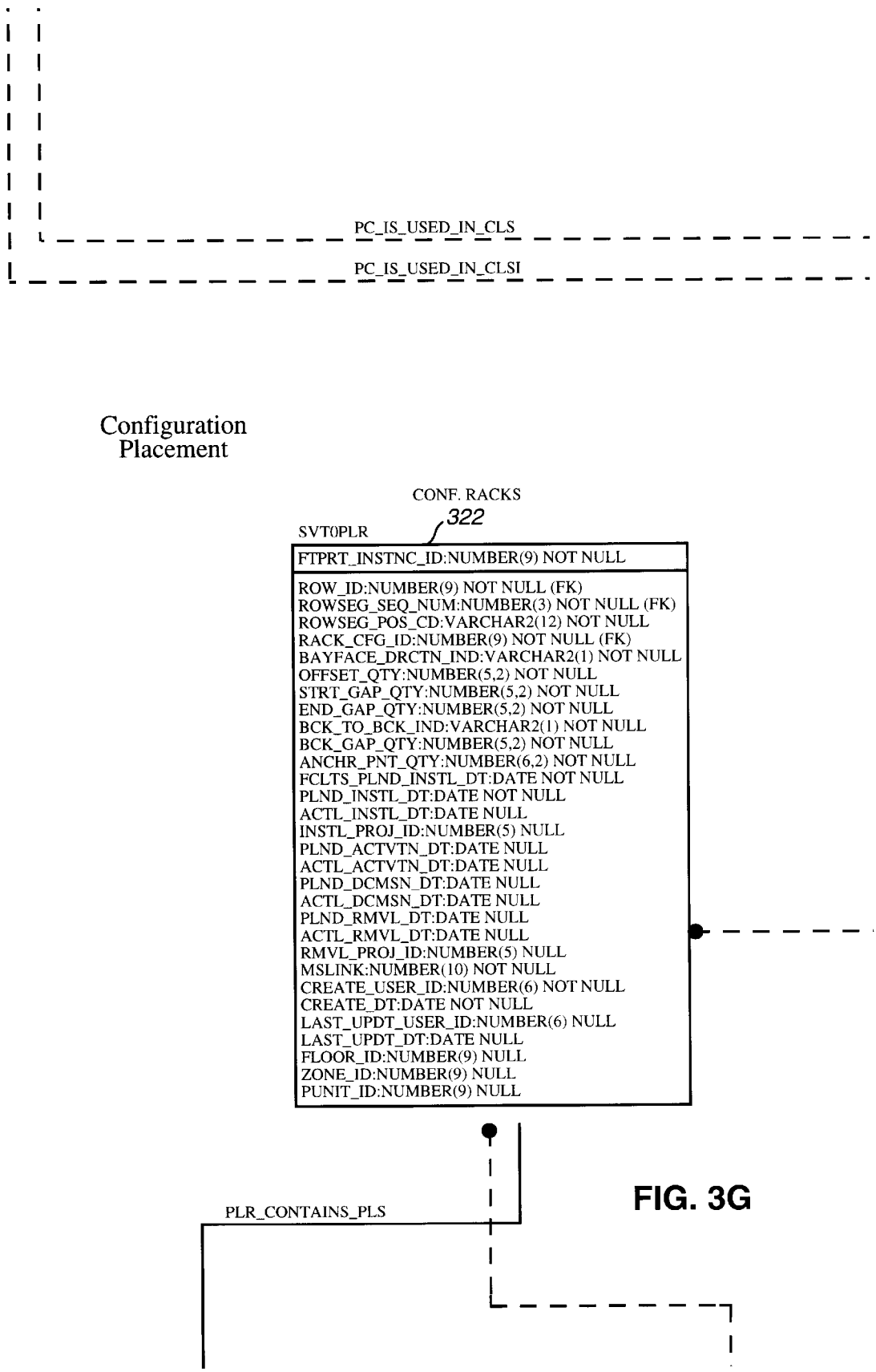

Referring now to FIG. 3F, the tables 319–323 is a portion of the database 108 referred to herein as the product catalog 126. Specifically, table 319 represents components, such as modules, shelves and racks, as previously described. Data fields within the product catalog table 319, preferably comprises detailed information about each component stored therein, such as a part number, a classification, and physical dimensions of the component. In a preferred embodiment, information common to all types of components is stored in the product catalog table 319, and information specific to pre-defined component types are stored in the database tables 320–323.

For example, the shelf table 320 represents additional information particular to shelf components. In this example, information such as the quantity of wire, coaxial and fiber connectors are stored in the shelf table 320. The card table 321 represents additional information particular to cards or module components. In this example, information such as actual and nominal electrical and power input and output requirements are stored in the shelf table 320.

Likewise, the rack table 322 represents additional information particular to racks, such as the dimensions of the rack header and rack footer areas. In addition, the HVAC rack table 323 represents additional information about HVAC (heating, ventilation and air conditioning) racks. In this example, such additional information includes quantities for air flow, BTUs per hour, air flow capacity and coolant specifications.

Figure 3H:
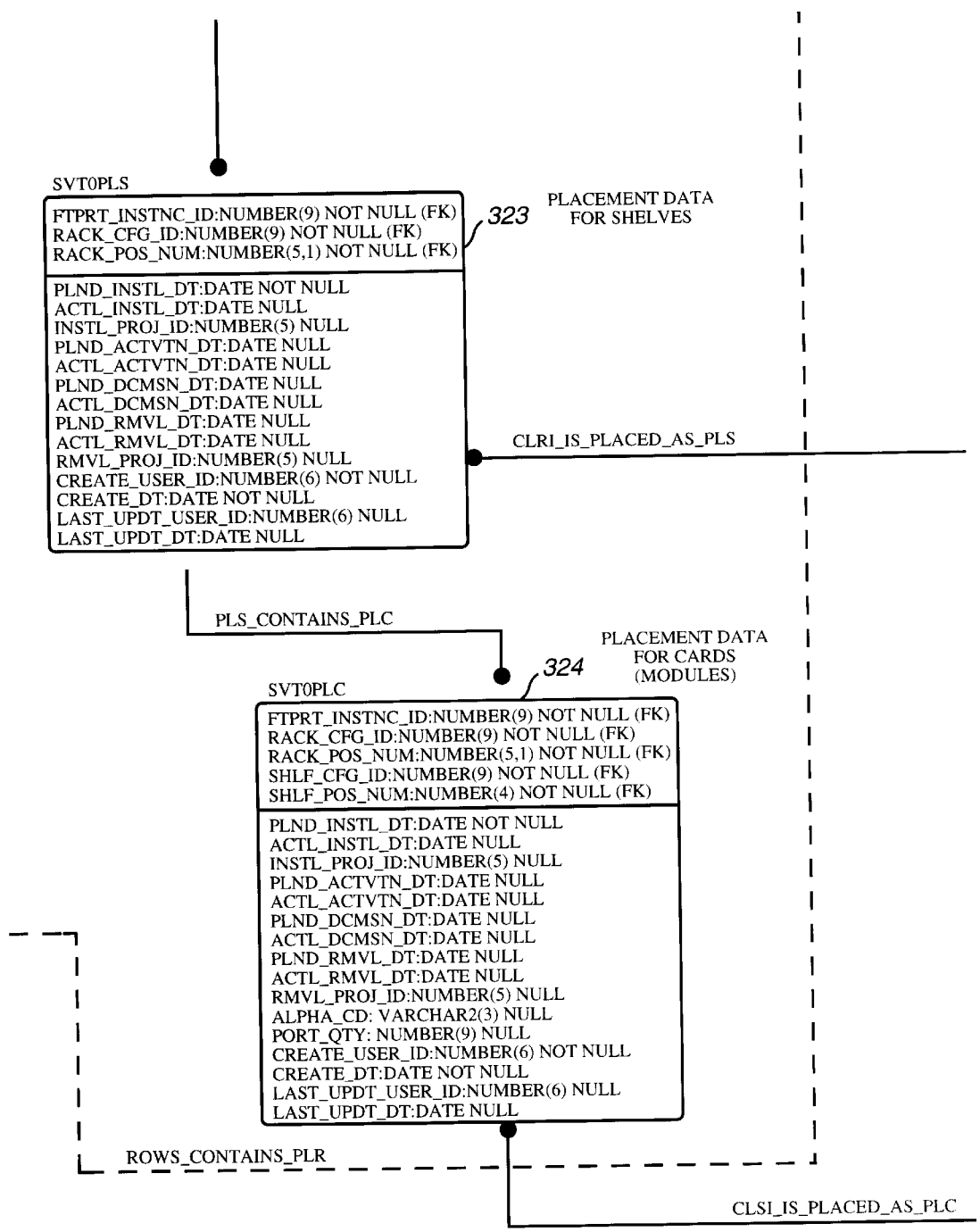
Figure 3I:
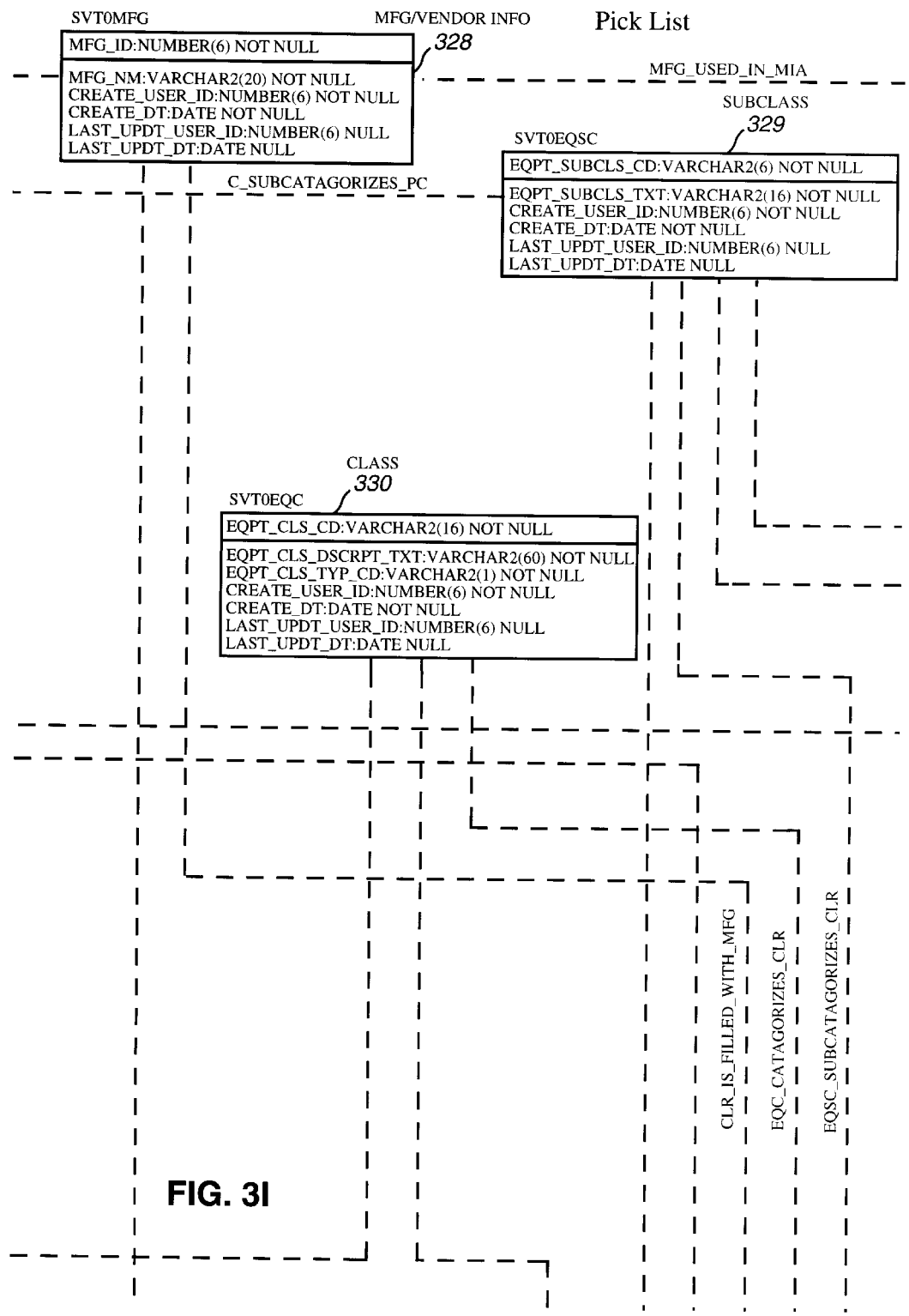
Figure 3J:
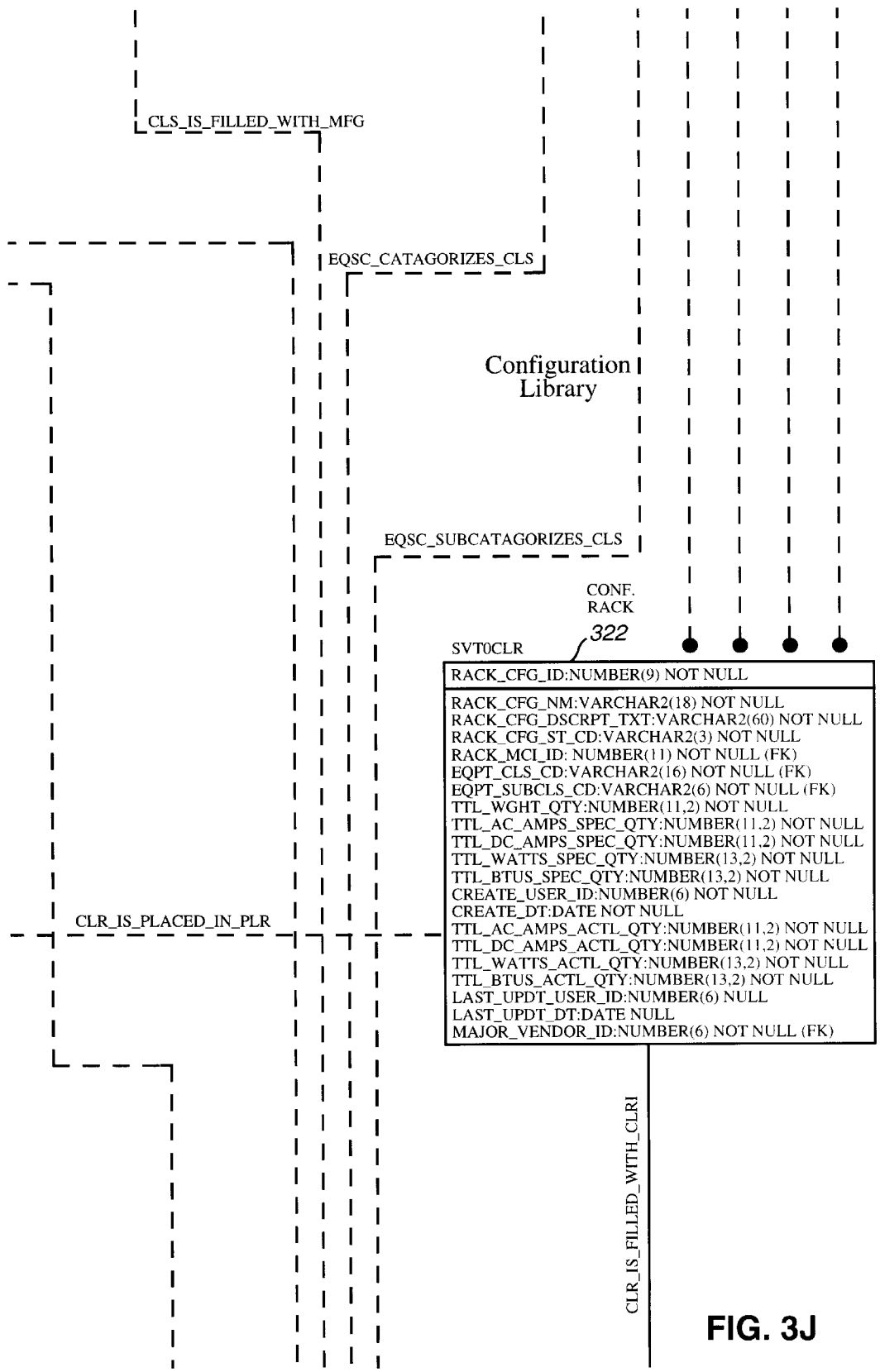
Figure 3K:
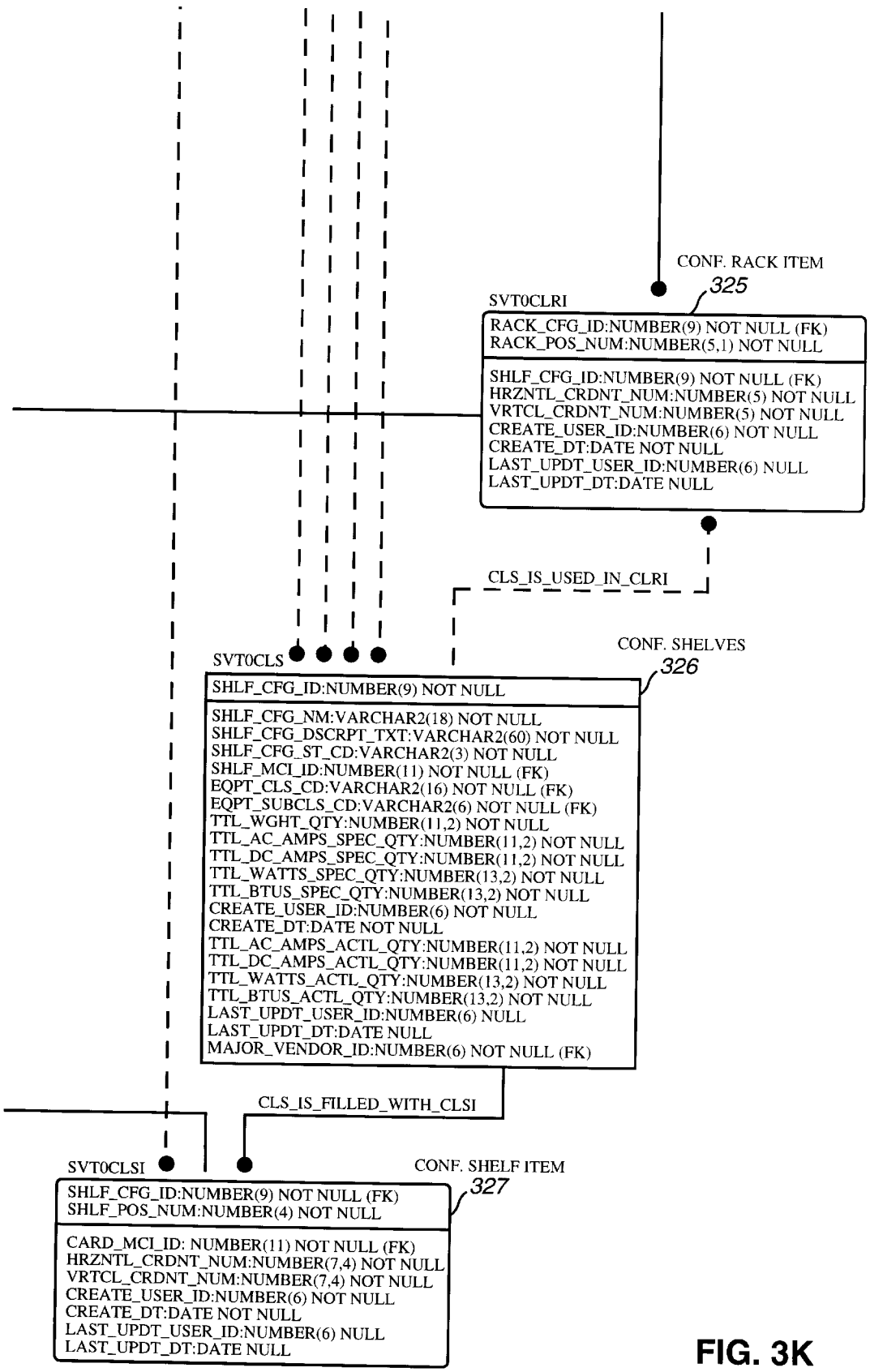

The tables in FIGS. 3G, 3H, 3J, and 3K represent portions of the database 108 referred to herein as the configuration library 128, and portions of the database used to store footprint information as described above. Specifically, the portion of the database referred to herein as the configuration library 128 is primarily represented by the configured racks table 3022 (FIG. 3J) and the configured shelves table 326 (FIG. 3K).

As shown by the interconnecting lines, both the configured racks and the configured shelves table 322 and 326, respectively, are related to the product catalog table 319. Specifically, as previously stated, configured racks and configured shelves are comprised of components (i.e. modules, shelves and racks), from the product catalog 319, that have been interrelated. In a preferred embodiment, the interrelationships for configured racks and shelves are defined with the use of a rackface tool 116.

The configured rack item table 325 (FIG. 3K) represents individual rack positions that are used to hold shelves, for each rack defined in the configured rack table 322. In a preferred embodiment, configured shelves that are installed in particular rack positions are defined by the configured shelves table 326. Accordingly, each entry in the configured shelves table 326 can correspond with a single entry in the configured rack item table 325. Note however, that entries within the configured shelves table 326 can be associated with multiple entries in the configured rack item table 325. This would be the case for example, if the same configured shelf is used in multiple rack positions in a single rack, or used in multiple racks.

The configured shelves item table 327 (FIG. 3K) represents individual shelf positions that are used to hold modules for each shelf defined in the configured shelves table 326. In a preferred embodiment, modules that are installed in particular shelf positions are defined by the product catalog table 319. Accordingly, each entry in the product catalog table 319 can correspond with an entry in the configured shelf item table 327. It should be noted however, that in a preferred embodiment, each entry within the product catalog 319 is typically associated with multiple entries in the configured shelf item table 327.

Preferably, the placement library 130 comprises the placement data for racks table 361 (FIG. 3G), the placement data for cards table 324 (FIG. 3H) and the placement data for shelves table 363 (FIG. 3H). The placement data for racks table 361 is used to place configured racks from the configured racks table 362 in particular row segments within the row segment table 3018. In this example, one or more racks can be placed in a particular row segment. This feature is preferably implemented by creating a footprint using a placement tool as previously described above.

Preferably, specific data fields within the placement data for racks table 361 are used for planning purposes. Such data fields are used to define specific time-related events such as planned and actual installation, activation, decommission and removal dates. This allows site planners to view data related to the configuration and placement of equipment in remote sites on a time dependent basis. Preferably, such information is provided at the rack, shelf and module level.

As described above, the placement data for rack tables 361 provides such time dependant data for field equipment at the rack level. Similarly, the placement data for shelves table 363, provides such time dependant data for field equipment at the shelf level. Likewise, the placement data for modules table 324 provides such time dependant data for field equipment at the module level.

Accordingly, site planners and other groups can view data related to field sites on a time-dependant basis. Preferably, each card (or module), shelf and rack that is placed within a remote site will have planned and actual installation, activation, decommission and removal dates associated with it. In this manner, users for example, can view the configuration and placement of equipment within remote field sites at a particular past, present or further date.

FIG. 10I comprises additional pick list tables from the pick list 134 portion of the database 108. Specifically, the vendor information pick list table 328 comprises valid values used to describe pre-defined manufactures. In this example, the vender information pick list table 328 is associated with the product catalog table 319, the configuration racks table 322 and the configuration shelves table 326. Similarly, the class pick list table 330 is used to store pre-defined values used to describe equipment classes. In this example, the class pick list table 330 is associated with the zone table 313, the configuration shelves table 322 and configuration racks table 326. Likewise, the sub-class pick list table 329 comprises pre-defined valid values used to describe equipment sub-classes. In this example, the sub-class pick list table 329 is associated with the product catalog 319, the configuration shelves table 322 and configuration racks table 326. In addition, in this example, the pick list tables 328, 329 and 330 are associated with the connection tables as described below with reference to FIG. 3L.

Figure 3L:
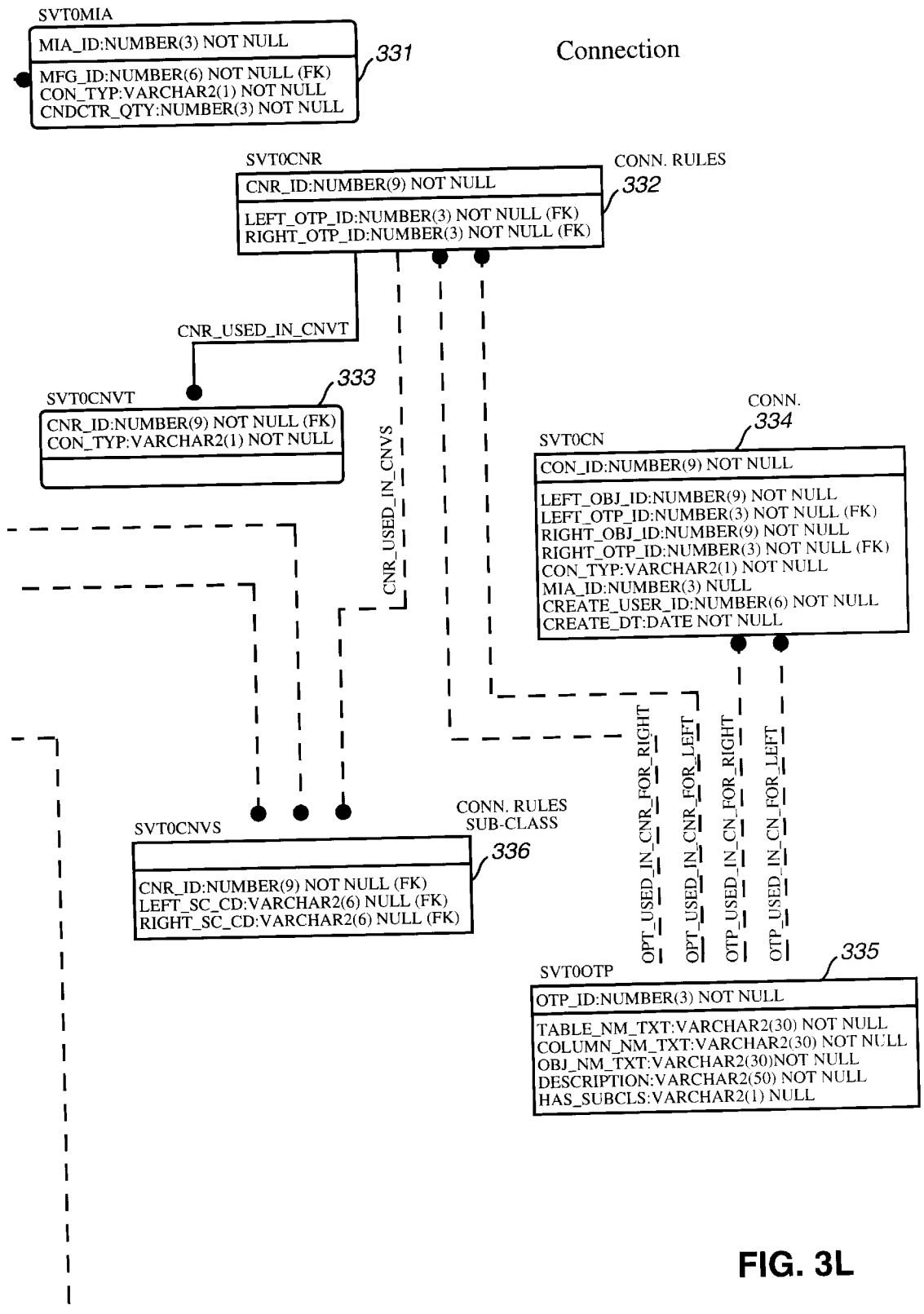

FIG. 3L comprises connection 136 portion of the database 108. Specifically, the connection tables 331–335 are used to connect one database entity with another database entity. In addition, the connection tables 331–335 are used in a preferred embodiment to define rules for connecting objects within the database 108 to one another. For example, the connection rules table 332 defines what types of objects can be connected together. Similarly, the connection rules subclass table 336 defines what sub-classes of equipment can be connected together. The connection table 334 is used to define what objects are connected together.

Figure 3M:
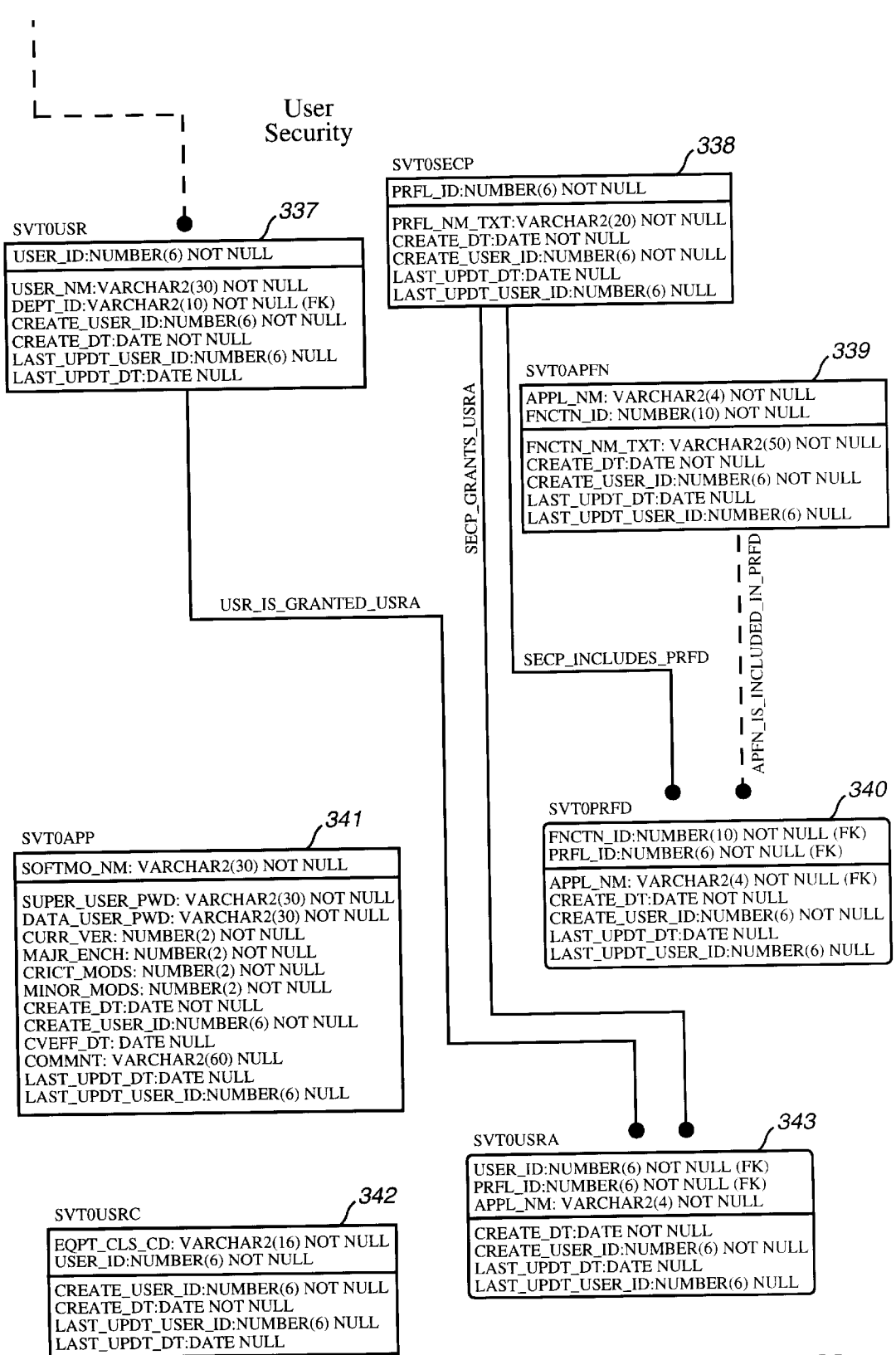

FIG. 3M comprises user security tables 337–343, that form the user security 132 portion of the database 108. These tables 337–343 are preferably used to control database access. In the preferred embodiment the tables 337–343 describe which functions are allowed to be performed by which users. For example, in one embodiment, only users within a particular power group are permitted to place power equipment in remote sites. Similarly, access to particular planning units, zones, equipment types, etc. may each be restricted to particular users or groups of users. Accordingly, such control may be implemented with the use of the user security tables 337–343 shown in FIG. 3M.

Figure 7:
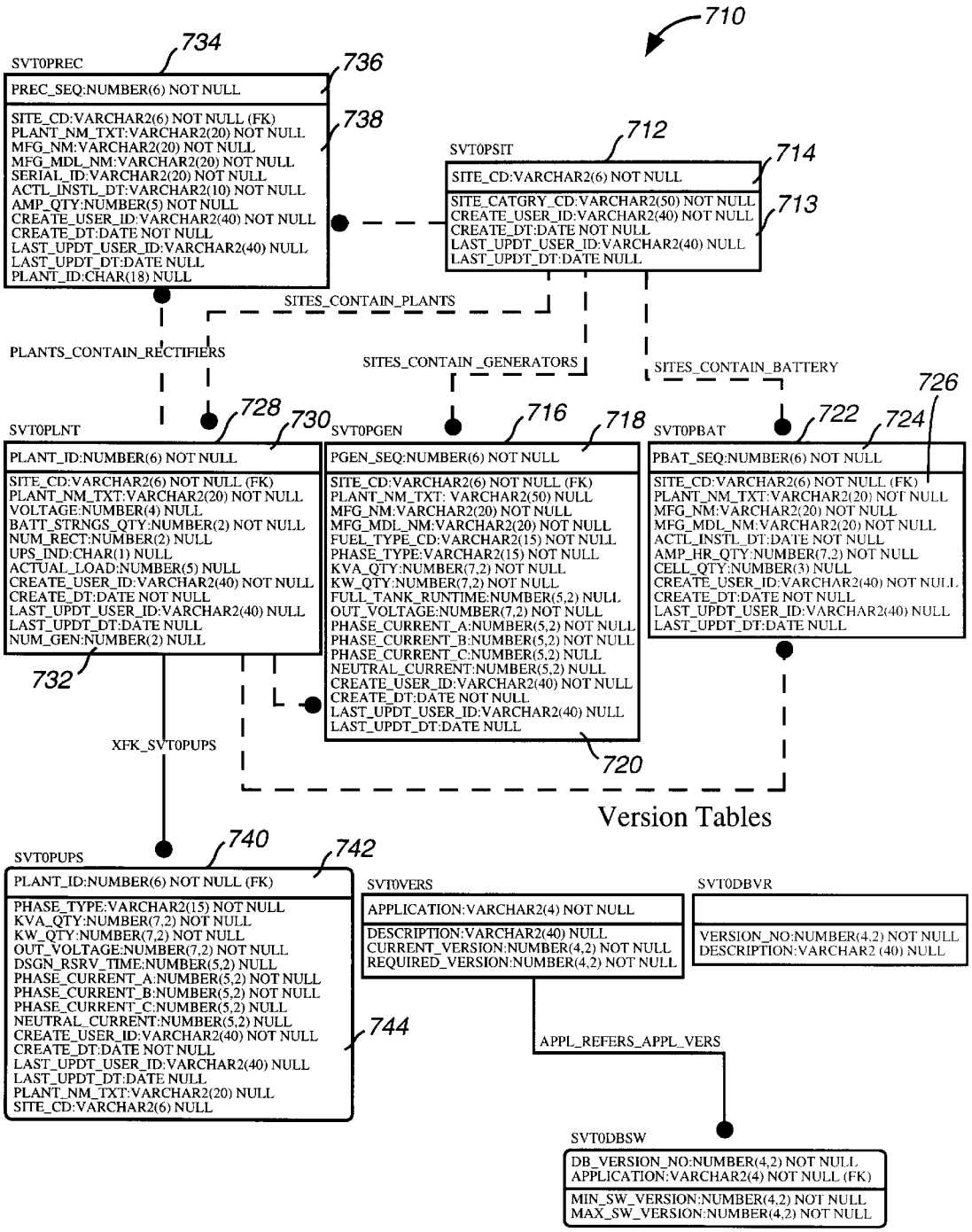
FIG. 7 is a representation of a temporary relational database which is useful for storing power plant data.

Power data is maintained in plant table 302 (FIG. 3C) and power tables 710 (FIG. 7). Referring to FIG. 7, power tables 710 include site table 712, battery plant table 728, rectifier table 734, UPS table 740, generator table 716 and battery table 722. Plant table 302 and power tables 710 are described more fully below.

POWER PLANTS AND RESERVE CALCULATION

Site planners and power engineers must insure that adequate power is supplied to consumer equipment, which may include telecommunication equipment located at telecommunication sites. Consumer equipment may require AC power, DC power or both. Typically, consumer equipment is provided with primary sources of power and a back-up or reserve sources of power. Primary power sources generally include off-site AC power sources from, for example, a local utility company.

Reserve power sources are provided to insure that consumer equipment remain operational, even in the event of scheduled and unscheduled interruptions to primary power sources. Back-up, or reserve, power sources may include a generator, such as a fossil fuel generator. Preferably, reserve power sources also include one or more battery-based power plants for supplying power in the event of loss of off-site power and generator power.

Figure 4A:
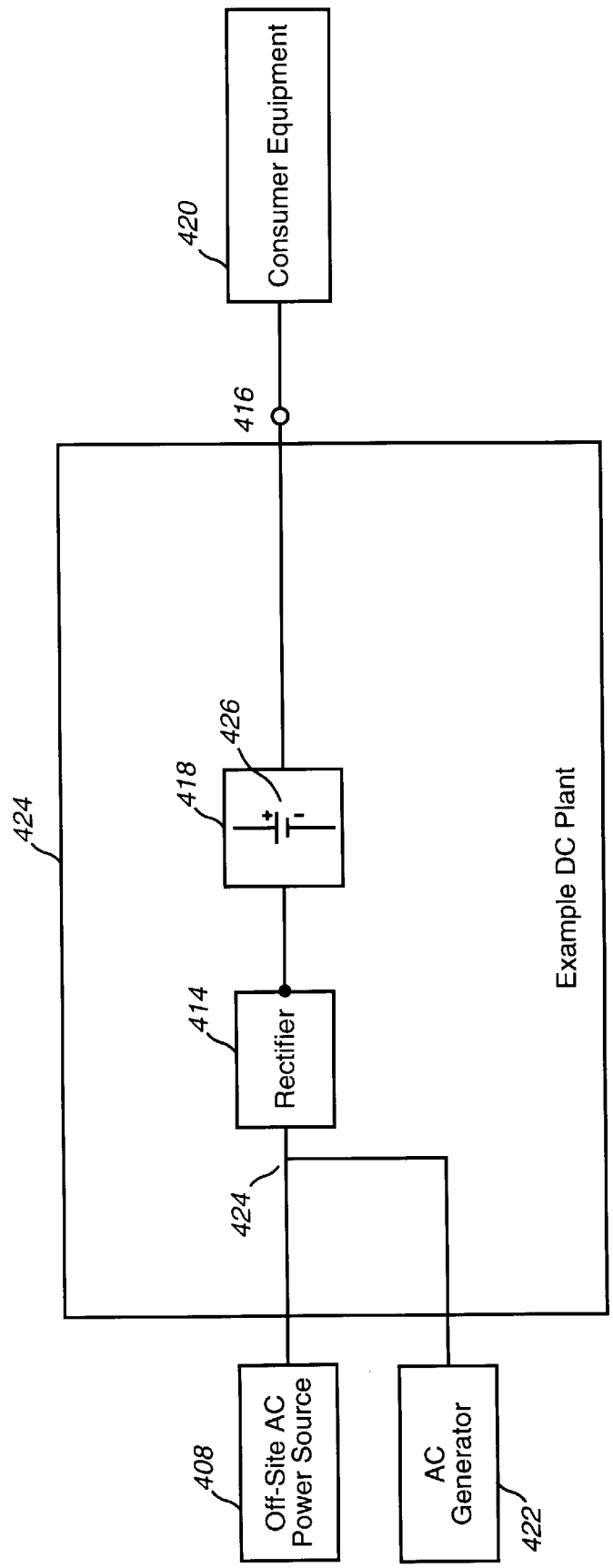
FIG. 4A is a block diagram example of a DC power plant which is useful for supplying reserve DC power to consumer equipment.

Referring to FIGS. 4A, an example of a DC power plant is provided as DC power plant 424. DC power plant 424 converts AC power from off-site AC power source 408, which may be, for example, a local utility company, to DC power for consumer equipment 420. Consumer equipment 420 may be, for example, one or more pieces of telecommunications equipment located at a telecommunications site. More than one DC power plants 424 may provide DC power to consumer equipment 420.

AC generators 422 may be provided to supply reserve power to consumer equipment 420, through DC power plant 424, in the event that off-site AC source 408 fails. In the event that off-site AC source 408 and AC generator 422 fails, DC power plants 424 automatically provide reserve power to consumer equipment 420. DC power plants 424 may also provide an automatic interim source of power to consumer equipment 420 until generator 422 is brought on-line.

In this example, DC power plant 424 includes one or more rectifiers 414 for converting off-site AC power from source 408 to DC power. Plant 424 also includes one or more battery strings 418, each string 418 having one or more batteries or cells 426. DC power plant 424 could, however, be configured in any of a variety of configurations.

During normal operation, batteries 418 are charged, and are maintained charged, by off-site power source 408, through rectifiers 414. If off-site AC power source 408 is interrupted for any reason, and if reserve power is not available from AC generators 422, battery strings 418 automatically provide power an uninterrupted supply of power to consumer equipment 420.

While battery strings 418 have a primary function of providing reserve power, they also serve to buffer power supplied to equipment 420. This buffering, effected via a capacitive effect of battery strings 418, reducing spikes and other fluctuations from sources 408 and 422 and from rectifiers 414.

Figure 4B:
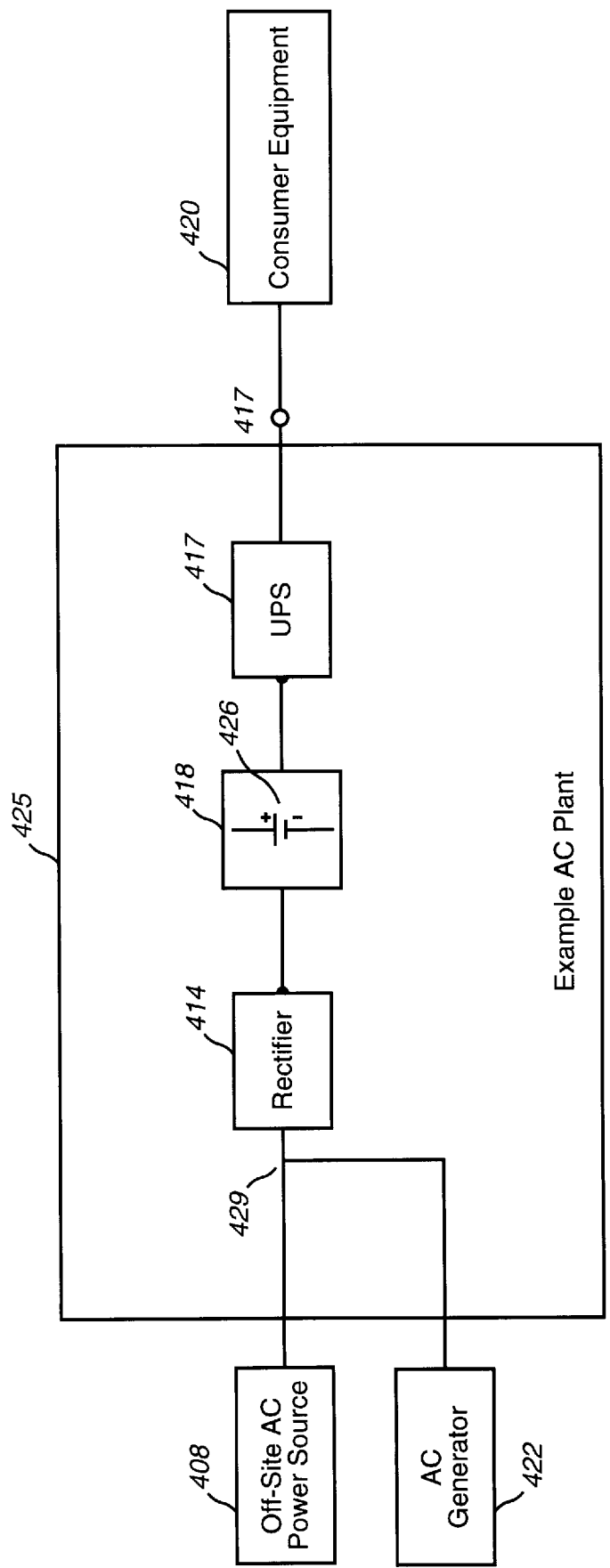
FIG. 4B is a block diagram example of an AC power plant which is useful for supplying reserve AC power to consumer equipment.

Referring to FIG. 4B, an example of an AC power plant is provided as AC power plant 425. AC power plant 425 supplies AC power to consumer equipment 420 from off-site power source 408 and, where provided, generators 422.

In this example, AC power plant 425 includes rectifiers 414 for converting AC power from AC sources 408 and 422 to DC power. DC power is then used to charge battery strings 418. DC power from rectifier 414, and battery strings 418 when necessary, is reconverted, or inverted to AC power in UPS 417. AC power is then provided to consumer equipment at coupler 417.

Note this power plants 424 and 425 are provided as example power plants only. One skilled in the are will recognize that a wide variety of power plants, employing any of a wide variety of components, could be employed for providing reserve AC and DC power to consumer equipment 420. The system and method which is disclosed below for storing power plant data and for calculating power plant reserve times, can be employed for power plants 424 and 425, as well as for any other type of power plant.

In order to ensure that power plants 424 and 425 are capable of providing reserve power for a specified period of time, a system and method are necessary for calculating available reserve times for battery plants 424 and 425 for a given load of consumer equipment 420. Throughout the remainder of this disclosure, where battery plant 424 is referred to, it should be understood that battery plant 425 or any other battery plant could be substituted.

Figure 5:
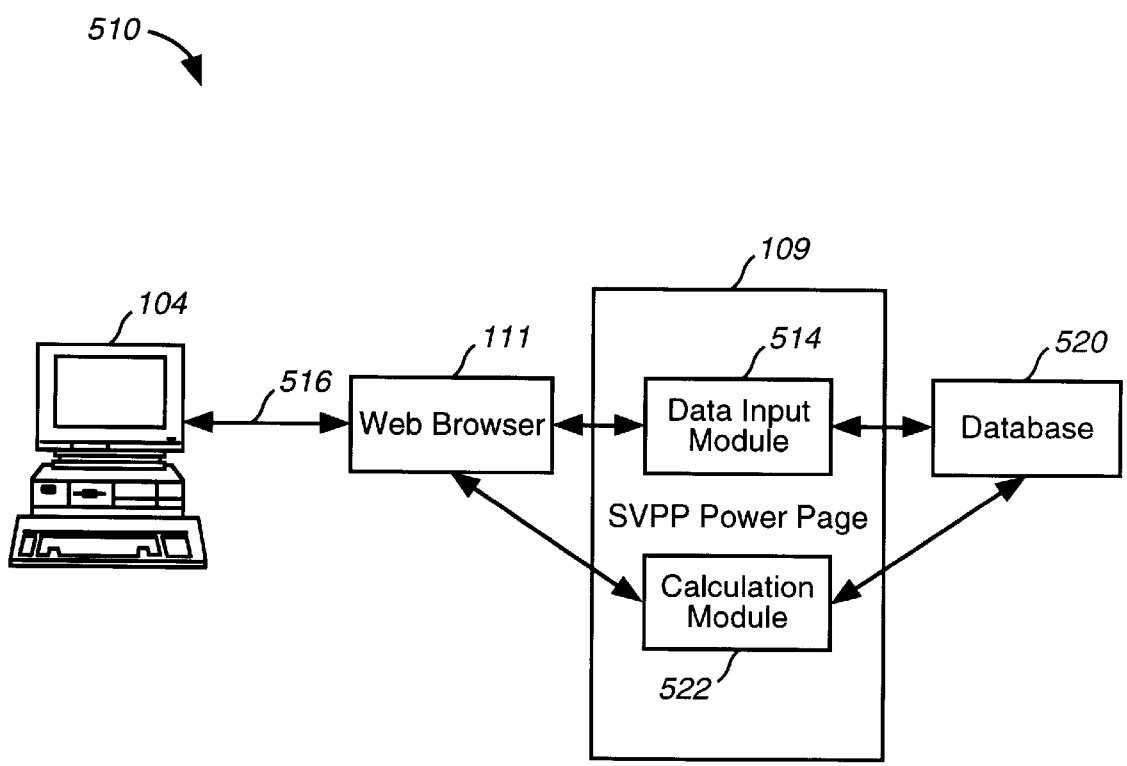
FIG. 5 is a block diagram of a preferred web-based system for storing power plant data and for calculating power plant reserve times.

Referring to FIG. 5, a web-based system 510 is provided for inputting power plant data into a database and for calculating power plant reserve times. In the preferred embodiment, system 510 is an integral part of a site facilities planning system for recording, maintaining and viewing equipment configuration and placement data.

System 510 includes and SVPP power page 109 and workstations 104 for interfacing users with SVPP power page 109. Workstations 104 interface with SVPP power page 109 via a link 516, which may be, for example, a telecommunications link. Preferably, workstations 104 are interfaced to SVPP power page 109 by a web browser based interfaced 111. Web browser based interface 111 permits authorized users to interface with power page 109 from any remote terminal such as a modem equipped computer running a web browser program.

Power page 109 interfaces with database 520 which maintains, among other things, information for consumer equipment consumer equipment 420. Preferably, database 520 is implemented as a relational database, although other types of databases could be employed. In a preferred embodiment, database 520 includes a relational SiteVu database 108, which includes a temporary relational Power Page database, discussed below.

SVPP Power Page 109 includes a data input module 514 for inputting data into database 520 and for receiving data from database 108 for validation. SVPP Power Page 109 also include a calculation module 522 for calculating power plant reserve times based on commands received from users at workstations 104.

Calculation module 522 retrieved battery data for power plants and calculates a stored potential value for power plants, based on the retrieved data. Calculation module 522 also retrieves a consumer equipment load value to determine how long a power plant can supply power for a given load. Calculation module may retrieve consumer equipment load values from database 520 or from workstations 104. Calculation module 522 employs hard-coded equations for calculating reserve times.

Preferably, calculation module 522 employs correction factors which overstate the load of consumer equipment 420 as seen at coupler 416 and understate the reserve power available from power plants 424. Such correction values may reflect non-ideal conditions which may exist in actual sites, such as battery age and site conditions. Correction values help to insure that reserve calculations are conservative calculations.

Web browser interface 111 determines whether to transmit data received from workstations 104 to data input module 514 or calculation module 522. Alternatively, SVPP power page 109 could be implemented coextensive with workstations 104, such as, for example, a run-time application installed on a computer associated with workstations 104. In this embodiment, web browser interface 111 could interface database 108 directly with workstations 104 and serve as an interface between database 108 and SVPP power page 109.

Figure 6:
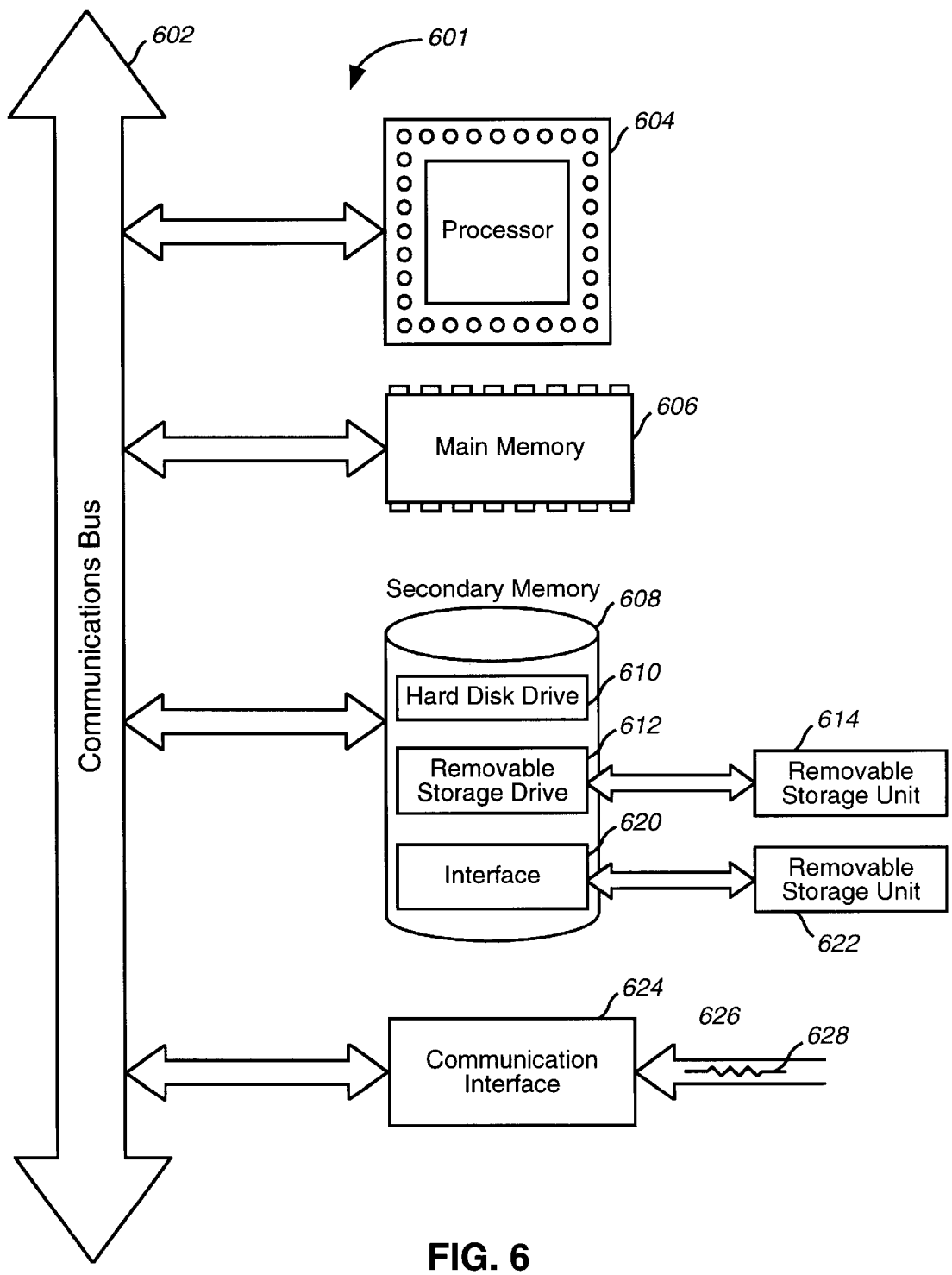
FIG. 6 is a block diagram of a computer system which is useful for implementing components of the present invention.

Power page 109 may be implemented using hardware, software or a combination thereof and may be implemented in a computer system or other processing system. Referring to FIG. 6, power page 109 may be implemented on a computer system 601. Computer system 601 includes one or more processors, such as processor 604. The processor 604 is connected to a communication bus 602. Various software embodiments are described in terms of this example computer system. After reading this description, it will become apparent to a person skilled in the relevant art how to implement the invention using other computer systems and/or computer architectures.

Computer system 601 also includes a main memory 606, preferably random access memory (RAM), and can also include a secondary memory 608. Secondary memory 608 can include, for example, a hard disk drive 610 and/or a removable storage drive 612, representing a floppy disk drive, a magnetic tape drive, an optical disk drive, etc. The removable storage drive 612 reads from and/or writes to a removable storage unit 614 in a well known manner. Removable storage unit 614, represents a floppy disk, magnetic tape, optical disk, etc. which is read by and written to by removable storage drive 612. As will be appreciated, the removable storage unit 612 includes a computer usable storage medium having stored therein computer software and/or data.

In alternative embodiments, secondary memory 608 may include other similar means for allowing computer programs or other instructions to be loaded into computer system 601. Such means can include, for example, a removable storage unit 622 and an interface 620. Examples of such can include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 601.

Computer system 601 can also include a communications interface 624. Communications interface 624 allows software and data to be transferred between computer system 601 and external devices. Examples of communications interface 624 can include a modem, a network interface (such as an Ethernet card), a communications port, a PCMCIA slot and card, etc. Software and data transferred via communications interface 624 are in the form of signals which can be electronic, electromagnetic, optical or other signals capable of being received by communications interface 624. These signals 626 are provided to communications interface via a channel 628. This channel 628 carries signals 626 and can be implemented using wire or cable, fiber optics, a phone line, a cellular phone link, an RF link and other communications channels.

In this document, the terms "computer program medium" and "computer usable medium" are used to generally refer to media such as removable storage device 612, a hard disk installed in hard disk drive 610, and signals 626. These computer program products are means for providing software to computer system 601.

Computer programs (also called computer control logic) are stored in main memory and/or secondary memory 608. Computer programs can also be received via communications interface 624. Such computer programs, when executed, enable the computer system 601 to perform the features of the present invention as discussed herein. In particular, the computer programs, when executed, enable the processor 604 to perform the features of the present invention. Accordingly, such computer programs represent controllers of the computer system 601.

In an embodiment where the invention is implemented using software, the software may be stored in a computer program product and loaded into computer system 601 using removable storage drive 612, hard drive 610 or communications interface 624. The control logic (software), when executed by the processor 604, causes the processor 604 to perform the functions of the invention as described herein.

In another embodiment, power page 109 is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, power page 109 is implemented using a combination of both hardware and software.

In a preferred embodiment, web-based system 510 is an integral part of a SiteVu facility planner which employs a SiteVu database, including power tables. In an alternative embodiment, system 510 is implemented as a stand-alone system in which power page 109 interfaces with a database (not shown in FIG. 5) which is separate from database 108 but which still includes power tables. The following discussion is directed to storing power data in both a preferred embodiment and an alternative embodiment.

Recall from FIG. 4 that a telecommunications site may include a variety of consumer equipment 420. Each site may also include any number of power plants 424 for providing uninterrupted and buffered power to consumer equipment 420. More than one power plant 424 may be associated with a particular consumer equipment 420. Each plant 424 includes one or more rectifiers 414 and one or more battery strings 418. For each site, there may also be one or more associated generators 422 and a UPS 417. One skilled in the pertinent arts will recognize that power plants 424 may be configured differently than described here.

In the preferred embodiment, where power page 109 interfaces with SiteVu database 108, power data may be stored in a main portion of database 108 with other site component data. In addition, power data may be stored as temporary data in power tables portion of database 108. A preferred embodiment of a power tables portion of database 108 is provided as power tables 710 in FIG. 7.

Note that in an alternative embodiment, where system 510 is implemented as a stand-alone system, power page 109 interfaces with a database which is separate from database 108. However, a database which is interfaced with a stand-alone system 510 preferably employs power tables 710 as well.

In the preferred embodiment, plant data relating to power plants 424 is stored in plant tables 302 (FIG. 3C). A separate row or entry is provided in table 302 for each plant 424 associated with a site. A site may include any number of power plants 424. For each entry, there are a number of field for storing data associated with a plant, including an actual load for consumer equipment 420 associated with a plant 424.

In addition to table 302, data relating to individual components associated with a plant are stored in other SiteVu database tables. For each rectifier 414, battery string 418 and UPS 417 associated with a plant 424, there is a separate row or entry in table 322 (FIG. 3F).

For example, table 322 provides footprint or location information for racks. Specific equipment located in racks, for example, battery strings, rectifiers or UPSs, may be stored in a configuration library 128 and a product catalog 126 of database 108. Typically, for each entry in table 322, there is an association with a configuration library 128 and product catalog 126 so that particular equipment can be identified by their footprint location.

In order to generate plant component data with power plants identified in plant table 302, connection rules are employed which define associations between power plants in table 302 and footprints in table 322. Connection rules may be stored in the connection portion 136 of database 108.

In both the preferred embodiment, where power page 109 is part of a comprehensive site facility planner, and in an alternative embodiment, where power page 109 is implemented as a stand-alone system, data for power plants 424 may be stored in power tables, as shown in FIG. 7.

Referring to FIG. 7, power tables 710 provide temporary storage for power data which may eventually be entered into tables 302, 322 and 334. In an alternative embodiment, where system 510 is implemented as a stand-alone system, power tables 710 may be employed as the only database.

Power tables 710 may store plant data for any of a number of telecommunications sites. Each site may include any number of power plants 424.

Power tables 710 include a variety of tables for storing data related to sites and power plants 424. Power tables 710 preferably include a site table 712 for identifying telecommunications sites, and a plant table 728 for identifying power plants 424 associated with sites. In addition, a rectifier table 734, a UPS table 740, a battery table 722 and a generator table 716 are provided for storing, respectively, specifications for rectifiers 144, batteries 426, UPSs 417 and generators 422, associated with power plants 424.

More specifically, site table 712 includes a separate row or entry for each telecommunications site. Each row or entry includes a number of columns or fields, including a site identifier field 714 for identifying particular sites. Additional fields 713 are provided for storing information such as site category, user ID, a table creation date, a table update date and an indication of the last individual to update the table.

Plant table 728 includes a separate row or entry for each battery plant 424. For each row or entry in plant table 728 there are a number of columns or fields for storing information relating to the plant 424. An identifier field 730 contains an identifier for identifying a particular plant 424. Fields 732 contain other information such as, for example, an associated site 420 (SITE_CD), a plant name, a voltage rating, a number of batteries 426 associated with the plant 424, a number of rectifiers 414 associated with the plant, an indication of whether a UPS is associated with the plant, an actual computer equipment load coupled to the plant, file creation and update information and a number of generators 422 associated with the plant.

Rectifier table 734 includes a separate row or entry for each rectifier 414. For each rectifier row or entry in table 734, there are a number of columns or fields for storing information relating to a particular rectifiers 414. An identifier field 736 identifies the particular rectifier. Fields 738 are provided for storing information related to the rectifier, such as, for example, an associated site identifier (SITE_CD), an associated plant identifier (PLANT_NM_TXT), manufacturer information, rated amperage, file creation and update information, etc.

Battery table 722 includes a separate row or entry for each battery plant 418. For each battery row or entry in table 722, there are a number of columns or fields for storing information relating to a particular battery plant 418. A battery identifier field 724 identifies a particular battery string 418. Fields 726 store information related to the battery, such as, for example, an associated site (SITE_CD), an associated plant 424 (PLANT_NM_TXT), manufacturer information, number of battery cells 426, etc.

UPS table 740 include a separate row or entry for each UPS 417. For each row or entry in UPS table 740, there are a number of columns or fields for storing information relating to the UPS 417. An identifier field 742 identifies the associated plant 424. Note that typically, there is, at most, only a single UPS 417 associated with a battery plant 424. Thus, there is no need to provide a unique identifier for a UPS 417. Rather, each row or entry in UPS table 740 includes a plant identifier (PLANT_ID) in field 742 for identifying a plant 424 associated with a UPS 417.

In UPS table 740, Fields 744 are provided for storing information relating to a particular UPS 417. This information may include information such as phase type, rated KVA, KW, output voltage, a design reserve time, etc.

Generator table 716 includes a separate row or entry for each generator 422. For each rectifier row or entry in table 716, there are a number of columns or fields for storing information relating to a particular generator 422. A generator identification field 718 identifies a particular generator 422. Fields 720 contain information related to the generator, such as, for example, an associated site identifier (SITE_CD), manufacturer information, fuel type, phase type, KVA rating, KW rating, fuel tank run time, etc.

In operation, power page users can update any data stored in power tables 710, regardless of whether power tables 710 are incorporated into database 108. In a preferred embodiment, outside of power tables 710, power page users can only update load values for consumer equipment 420, stored in table 302. Regardless of whether data for a plant 424 is stored in power tables 710 or stored in other tables in database 108, power page users can calculate reserve times for power plants 424.

One skilled in the art will appreciate that a relational database may be organized as a single table or any number of tables for storing information relating to elements of a battery-based plant. In addition, although the preferred embodiment employs a relational database, one skilled in the art will appreciate that other databases may be employed as well.

Figure 8:
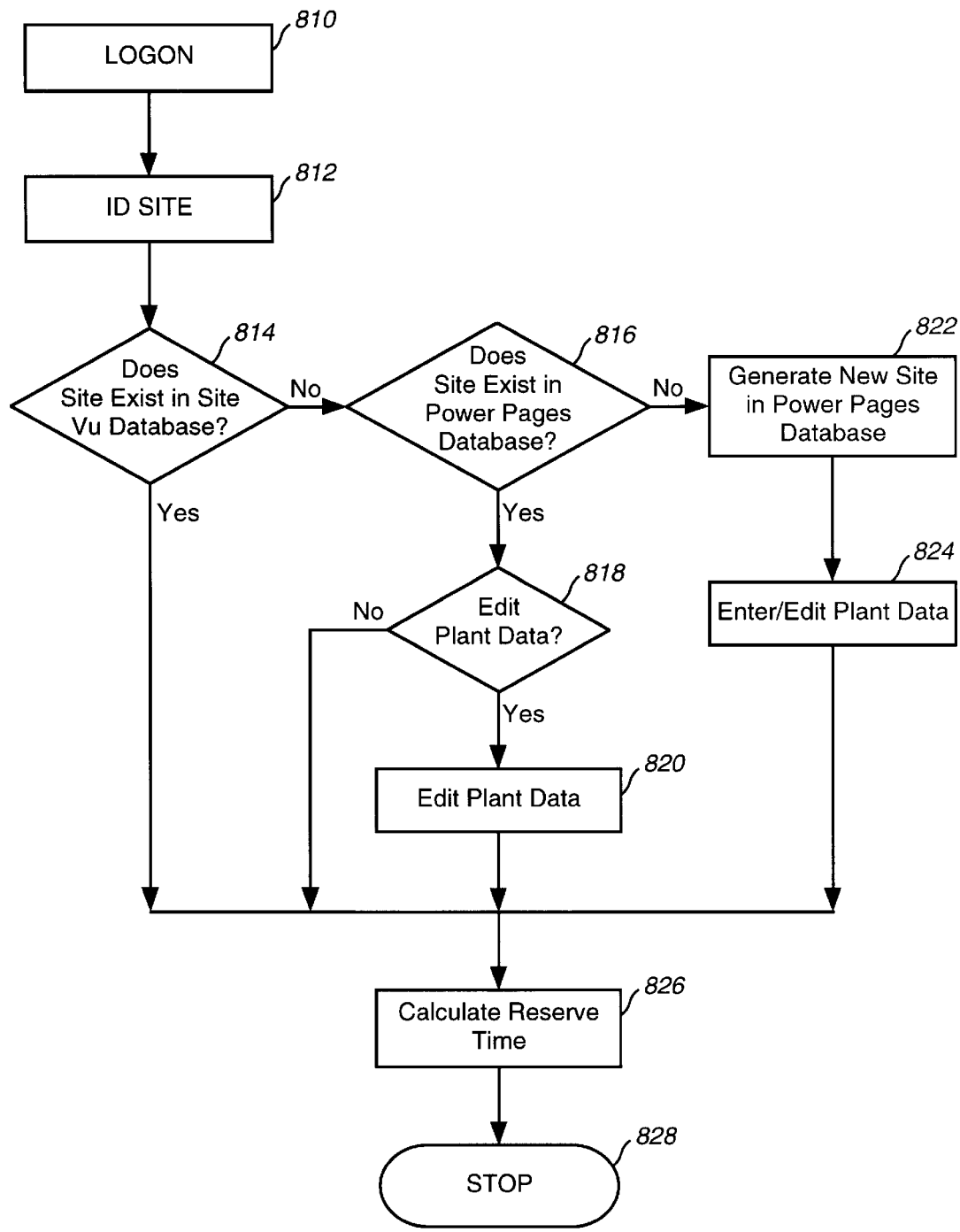
FIG. 8 is a process flowchart depicting a process for inputting power plant data into a database and for calculating reserve times for power plants.
Figure 14:
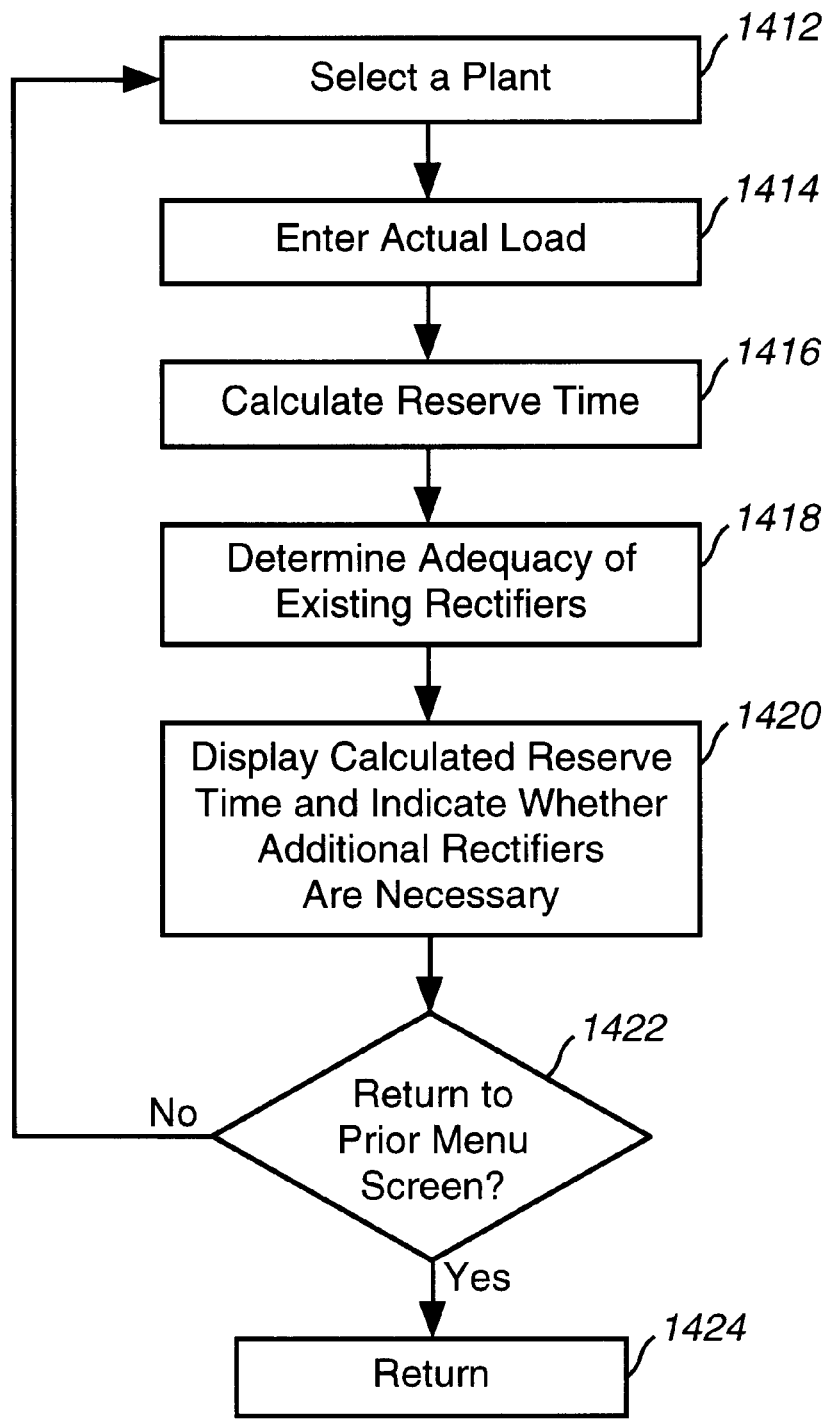
FIG. 14 is a flowchart depicting a process for calculating reserve times for a plant.

Referring to FIG. 8, a preferred method for entering and editing power data in a database is provided in steps 810–824. In addition, a method for calculating reserves is provided in steps 826. Step 826 is described in more detail in the flowchart of FIG. 14.

In step 810, a user logs on to system 510 on at workstation 104. In the preferred embodiment, where workstations 104 interface power page 109 via web browser 518, the user logs on by first accessing a web page, such as web page 1510 shown in FIG. 15. If the user wishes to proceed, the user points to "logon" button 1514. Upon pointing to logon button 1514, the user is provided with a logon screen such as, for example, logon screen 1610 in FIG. 16. Web page 1510 also permits the user to return to a prior screen by pointing to "back" button 1512.

In step 812, the user is prompted to identify a telecommunications site. Using logon screen 1610 as an example, the user is prompted to enter a six letter site code in box 1614 and a site category in box 1616. Preferably, the user is provided with a pull-down menu list of sites in box 1616. The user inputs an e-mail address in box 1618.

Once the necessary data is entered in logon screen 1610, the user at workstation 104 points to, or clicks on, a logon button 1612. An attempt is made to verify that the user is permitted to access the system. Verification may be performed by Power Page 109 or by some other module. Verification may include accessing user security tables 337–343 in FIG. 3M. After the user is verified, the user is logged on.

In steps 814 and 816, system 510 determines whether the site entered in step 812 already exists in a database. Where system 510 is an integral part of a SiteVu facility planner employing database 108, and where database 108 includes power tables 710, a site search is performed on SiteVu site table 304 (FIG. 3C) and on power tables 710 site table 712. More specifically, in step 814, SiteVu site table 304 is searched. In step 816, Power Page table 712 is searched. Where system 510 is employed as a stand-alone system, only Power Page table 712 is searched and step 814 is omitted.

Recall that, in a preferred embodiment, outside of power tables 710, power page users cannot edit SiteVu tables except editing load values of consumer equipment associated with power plants. Thus, in step 814, if the site entered in step 812 is found in SiteVu table 304, the user is not permitted to edit data. Indeed, control passes to step 826 where the user can calculate reserve times.

If the site entered in step 812 is not found in the main SiteVu database, control passes to step 816, where power tables 710 are searched for the site entered in step 812. If the site is found in power tables 710, the user may edit data associated with the site or may calculate reserve time for a power plant associated with the site.

In step 818, if the user selects to calculate a reserve time, control passes to step 826. Details of step 826 are provided below. If, however, the user selects to edit plant data, control passes to step 820.

Figure 17:
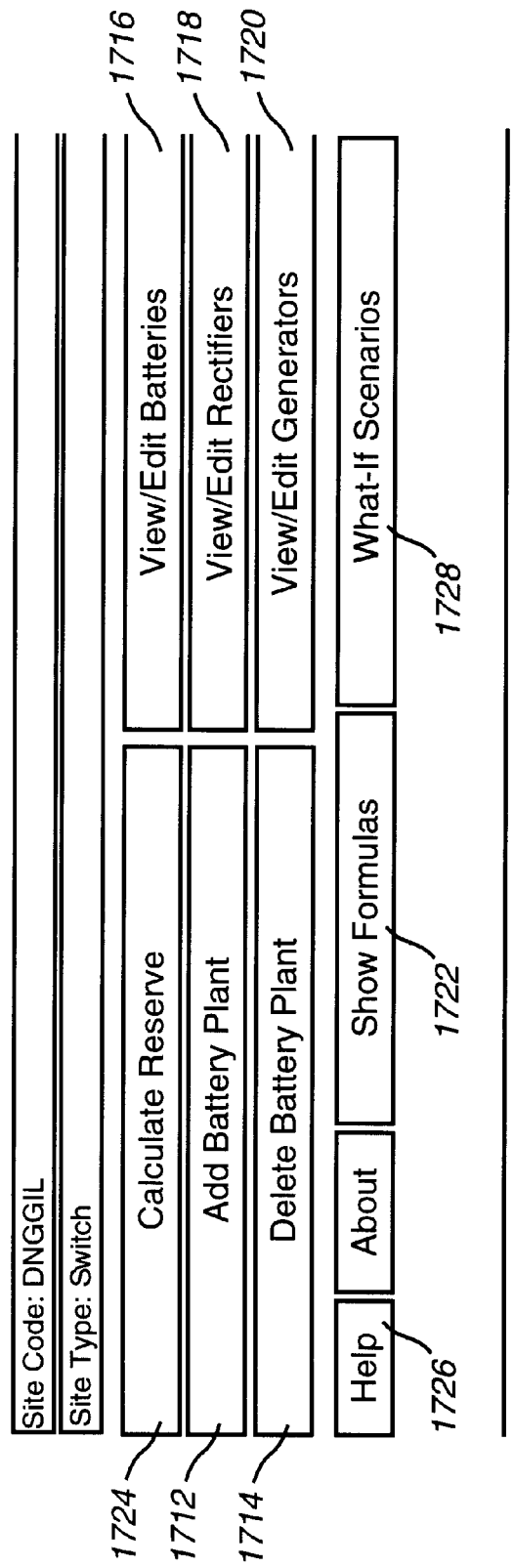
FIG. 17 is a print-out of a web-page screen providing a variety of options to the user.

In step 820, the user is prompted to edit plant data for one or more power plants associated with the site entered in step 812. In a preferred embodiment, the user is presented with the screen display 1710, reproduced in FIG. 17. Editing options and other options presented in screen display 1710 are described more fully below.

Referring back to step 816, if the site entered in step 812 is not found in the power tables, a new entry is generated in the power tables. Note that a new entry is not generated in main SiteVu site table 304. This is because, preferably, power page users cannot create sites or edit data associated with sites unless the site is in power tables 710. Only authorized users of a placement tool may create sites and edit data associated with sites in the main portion of SiteVu database 108. This serves as a control mechanism over the data contained in SiteVu database 108.

In generating a new site in power tables 710, a new row or entry is generated in site table 712. The new row or entry includes an identification field 714 (SITE_CD) for storing the site name entered in step 812. Additional fields 713 may be generated for storing additional data associated with the new site. The user may be prompted to enter additional data for entry into fields 713. This data my include a site category, a creator identification, a creation data and file update information.

After the new site is generated, control passes to step 824 where the user is prompted to add plant data associated with the new site. Since any number of power plants may be associated with a site, the user is preferably permitted to enter plant data for any number of power plants. In a preferred embodiment, the user is presented with the same screen display 1710, which is preferably presented to the user is step 820.

In steps 820 and 824, the user is preferably provided with a list or menu of options for adding, deleting or editing components of power plants associated with the site entered in step 812. Preferably, the user is presented with a main control panel screen display 1710. Main control panel 1710 includes a variety of options which a user can select with a pointing device, such as a mouse. The selectable options include an Add Battery Plant button 1716, a Delete Battery Plant button 1714, a View/Edit Batteries button 1716, a View/Edit Rectifiers button 1718, a View/Edit Generators button 1720, a Show Formulas Button 1722, a Calculate Reserve button 1724, a Help button 1726 and a What-if Scenarios button 1728.

Figure 9:
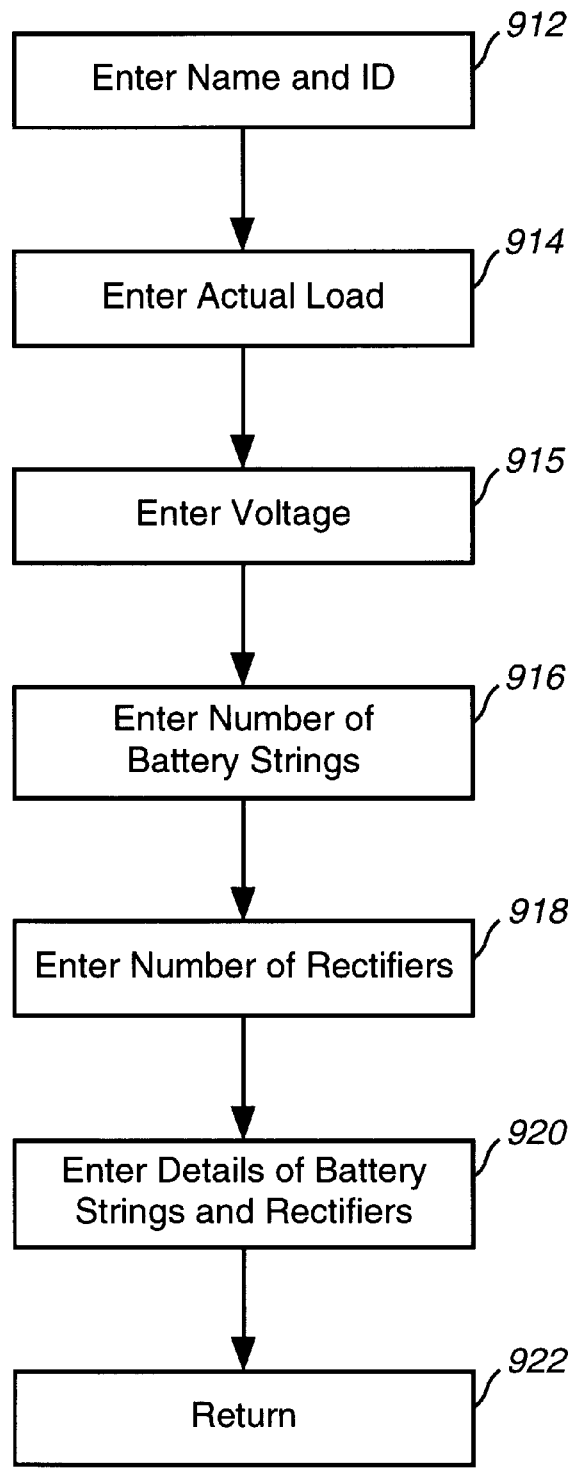
FIG. 9 is a flowchart depicting a process for inputting new power plant data into a database.

A user at workstation 104 may wish to add a new plant to a site when, for example, a new site is generated in step 822, or new plant is being added to an existing site. In screen 1710, the user adds new power plants by selecting Add a Battery Plant button 1712. The user is then presented with an Add Battery Plant Screen, such as, for example, Add Battery Plant Screen 1810 of FIG. 18. Referring to FIG. 9, a process of adding new power plants is provided.

In step 912, the user is prompted to enter a plant name and identification number for a new plant to be associated with the site entered in step 812. In screen 1810, this data is entered into box 1812. This data is sent, via link 516, to Power Page 109 which forwards it to power tables 710 for updating.

In plant table 728, a new row or entry is generated for the new plant named and identified in step 912. This new entry will include an identifying field 730. The data entered in box 1812 is automatically entered into identifying field 730 for identifying the new plant. The new entry also includes fields 732 for storing additional site data, including a site identifier (SITE_CD), which is automatically entered for associating the plant with the site entered in step 812.

In steps 914, 915 and 916, the user is prompted to input basic information for battery strings 418 associated with the new plant 424. More specifically, in step 914, the user is prompted to enter an actual load in box 1814. Preferably, actual load is the actual load of consumer equipment 420, measured at coupling 416. The actual load is then stored in a field 732 of the new entry in plant table 728. This value may be employed later in calculating a reserve time for this new plant.

In step 915, the user enters a plant voltage. As indicated in box 1816, the user also indicates whether the plant is an AC or DC plant. In box 1816, the designation UPS indicates an AC plant having a UPS inverter 417. If the new plant is an AC plant, a new entry or row is generated in UPS table 740.

In step 916, the user is prompted to enter the number of batteries strings 418 to be associated with the new plant 424. Recall that each plant 424 has one or more associated battery strings 418, each battery string including a group of batteries 426. The number of battery strings is entered in box 1818 of screen 1810 and saved in one of fields 732 of plant table 728. In battery table 722, a new row or entry is generated for each new battery string 418 of the new plant 424. Each new entry includes an identifier field 724 for identifying a particular battery string 418, and a set of fields 726 for storing battery detail information as described below.

In step 918, the number of rectifiers 414 associated with the new plant 424 is entered in box 1820 and saved one of field 732 of plant table 728. In rectifier table 734, a new row or entry is generated for each new rectifier 414. Each new entry includes an identifier field 736 and a set of fields 738 for storing rectifier detail information as described below. After the user enters this data, the user points to Next button 1822.

In step 920, the user at remote terminal 512 is prompted to enter details for each battery string 418 and each rectifier 414 identified in steps 916 and 918. For each battery string, this information may include number of batteries or cells for the string, vendor name, model number, installation date and battery amp hours. This data is saved in the new entry or row in battery table 722 associated with each new battery string.

For each rectifier, this information may include vendor name, model number, serial number, installation date and full-load amp rating. This data is saved in the new entry or row in rectifier table 734 associated with each rectifier.

After details of the new plant are entered into power tables 710, control is passed to step 922 which immediately passes control back to step 820 or 824.

In steps 820 and 824, a user at workstation 104 may wish to delete an existing plant 424 from a site where, for example, a plant 424 is being replaced by another plant 424. In order to delete a plant 424, a user selects Delete Battery Plant button 1714 from main control panel 1710. The user is then presented with a Delete Battery Plant Screen, such as, for example, Delete Battery Plant Screen 1910 of FIG. 19.

Figure 10:
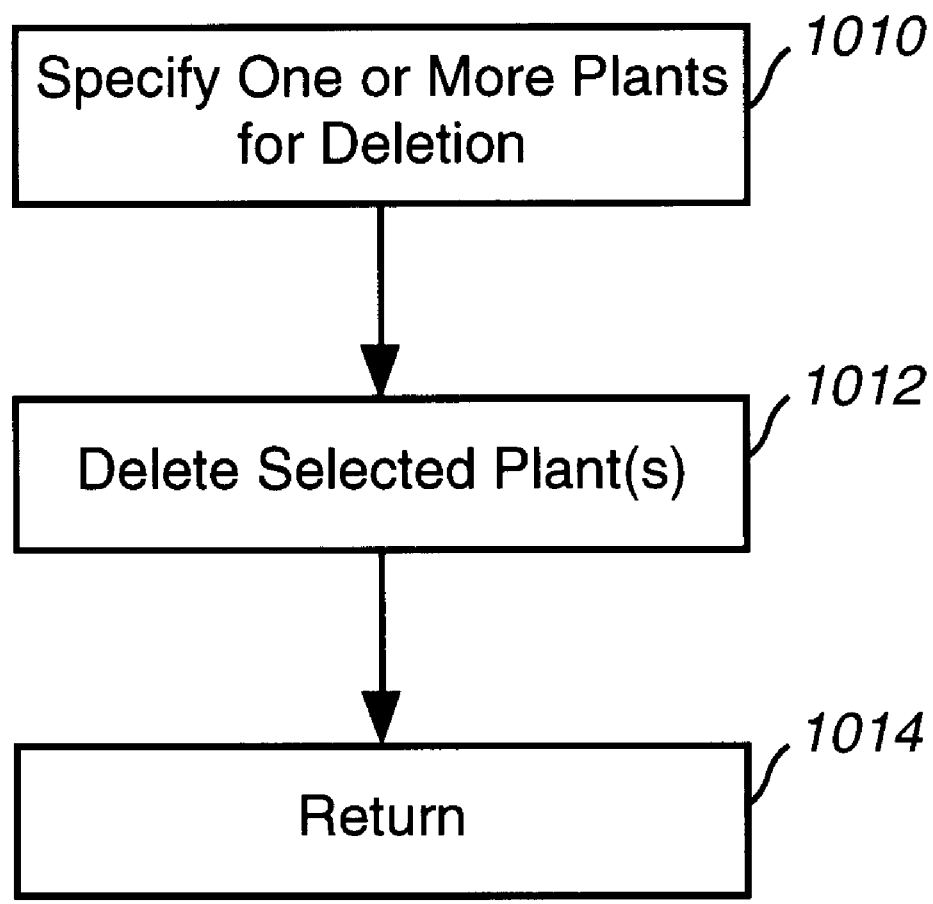
FIG. 10 is a flowchart depicting a process for deleting plant data from a database.

Referring to FIG. 10, a process for deleting power plants is provided. In step 1010, the user is prompted to specify one or more power plants 424 for deletion. Preferably, screen 1910 provides the user with a pull-down list 1912 of power plants available for deletion. Preferably, if the user wishes to delete more than one plant, the user may highlight multiple power plants 424 from the pull-down menu.

In step 1012, the user points to OK button 1914 of screen 1910 to effect deletion. In power tables 710, each row in plant table 728 associated with a plant selected in step 1010 is deleted. In addition, in battery table 722, rows or entries associated with batteries 426 which are associated with the power plants 424 selected for deletion are also deleted. Furthermore, in rectifier table 734, rows or entries associated with rectifiers 414 which are associated with power plants 424 selected for deletion are also deleted.

In step 1014, after all deletions are made to power tables 710, control is returned to step 820 or 824.

A user may wish to add or delete a battery or edit specifications of an existing battery string associated with a plant 424, for example, to increase the available reserve time of plant 424. Alternatively, a battery string 418 may need to be replaced due to damage or aging, or a user may simply wish to edit specifications for an existing battery string.

Figure 11:
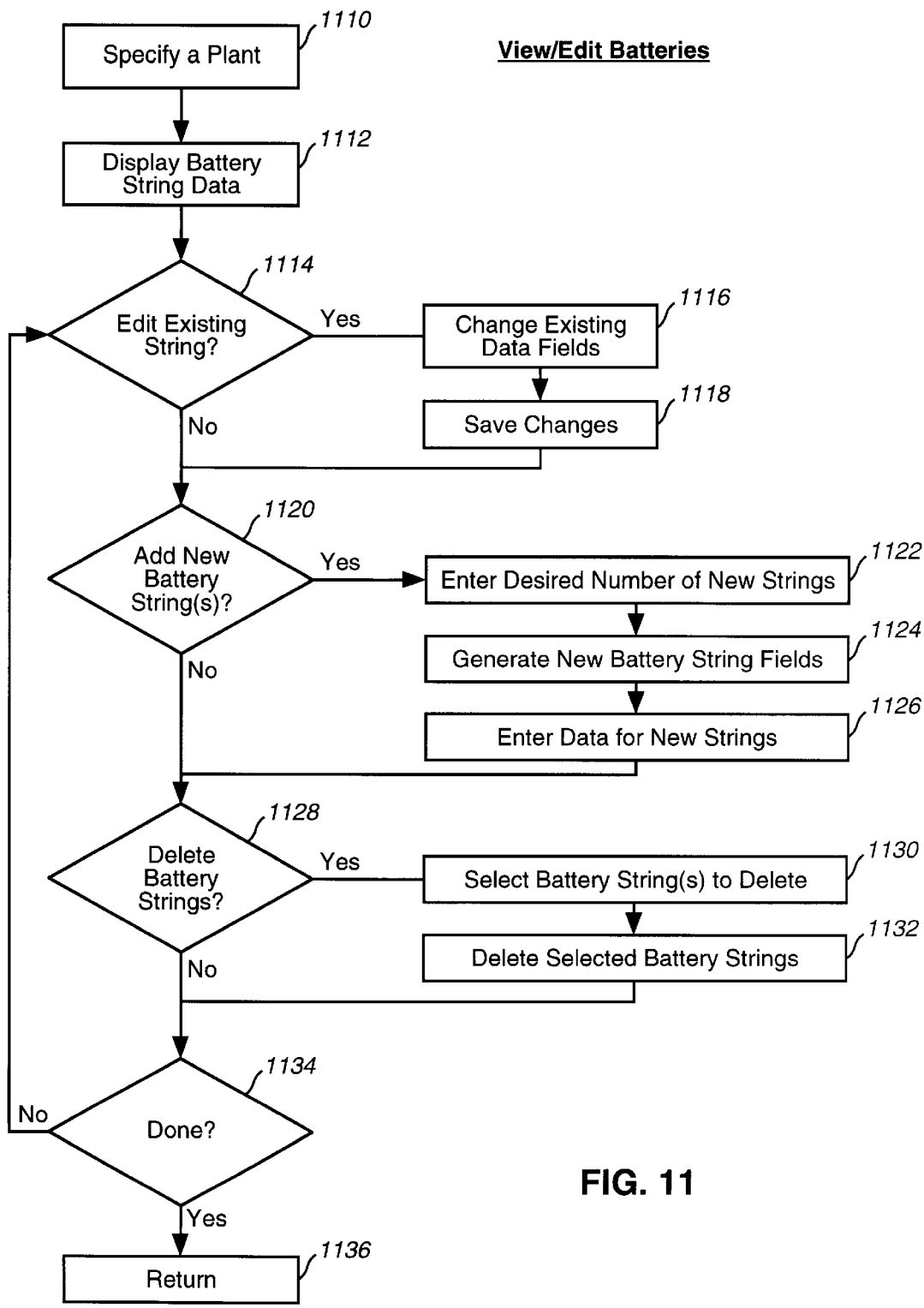
FIG. 11 is a flowchart depicting a process for adding, deleting and editing battery data associated with a plant in a database.

A user can add or delete batteries or edit existing battery specifications by selecting View/Edit Batteries button 1716 from main control panel 1710. Referring to FIG. 11, a process for editing battery strings is provided.

Figure 20:
FIG. 20 is a print-out of a web-page screen for selecting a plant for adding, deleting and editing battery data associated with the plant.
Figure 22:
FIG. 22 is a print-out of a web-page screen for selecting a plant for adding, deleting and editing rectifier data associated with the battery plant.

In step 1110, the user is prompted to select a plant 424. Recall that a site identified in step 812 may have a number of associated power plants 424. Thus, the user is preferably presented with a screen such as screen 2010 having a pull-down menu, such as menu 2014 of FIG. 20, providing a full list of available power plants for the site entered in step 812.

In step 1112, the user is presented with a display of battery data which may include, for example, vendor name, model number and installation date. This data may be presented in the form of screen display 2110 of FIG. 21, for example. From screen display 2110, the user may add or delete batteries for the plant selected in step 1110 or may edit existing battery data for the plant.

In step 1114, if the user selects to edit an existing string, control passes to step 1116. In step 1116, the user inputs desired changes to any of the battery fields displayed in screen 2110.

In step 1118, changes made in step 1117 are saved to power tables 710 by, for example, pointing to save changes button 2112.

In step 1120, if the user wishes to add a new battery string to the plant selected in step 1110, the user points to add button 2114 on control panel 2110 and control passes to step 1122. In step 1122, the user is prompted to enter a desired number of new battery string 418 to be associated with the plant 424.

In step 1124, a new row or entry is generated in battery table 722 for each new battery.

In step 1126, the user is prompted to enter information associated with each new battery string identified in step 1122. This data is entered into the new row or rows of battery table 722 generated in step 1124. In addition, plant table 728 may be updated to associate the newly-added battery string 418 with the plant. After entering the new data, the user is again presented with the selections of screen 2110.

In step 1128, the user may select to delete a battery string from the plant specified in step 1110, by pointing to remove button 2116 in screen 2110. Control then passes to step 1130.

In step 1130, the user selects battery strings 418 for deletion. In screen 2110, the user highlights batteries for deletion.

In step 1132, the user initiates deletion of the selected battery strings from power tables 710 by pointing to remove button 2116. The data associated with the selected battery or batteries is then deleted from battery table 722. In addition, plant table 728 may be updated to remove any association to the deleted battery string. After deleting the selected battery string data from power tables 710, the user is again presented with the selections of screen 2110.

In step 1134, the user may exit to the main control panel menu 1710 or may remain in the View/Edit Batteries screen 2110. If the user chooses to remain, control returns to step 1112 where the user continues to be presented with the choices presented in screen 2110. If the user is done with View/Edit Batteries screen 2110, the user points to cancel button 2118 and control is returned to step 820 or 824.

Figure 12:
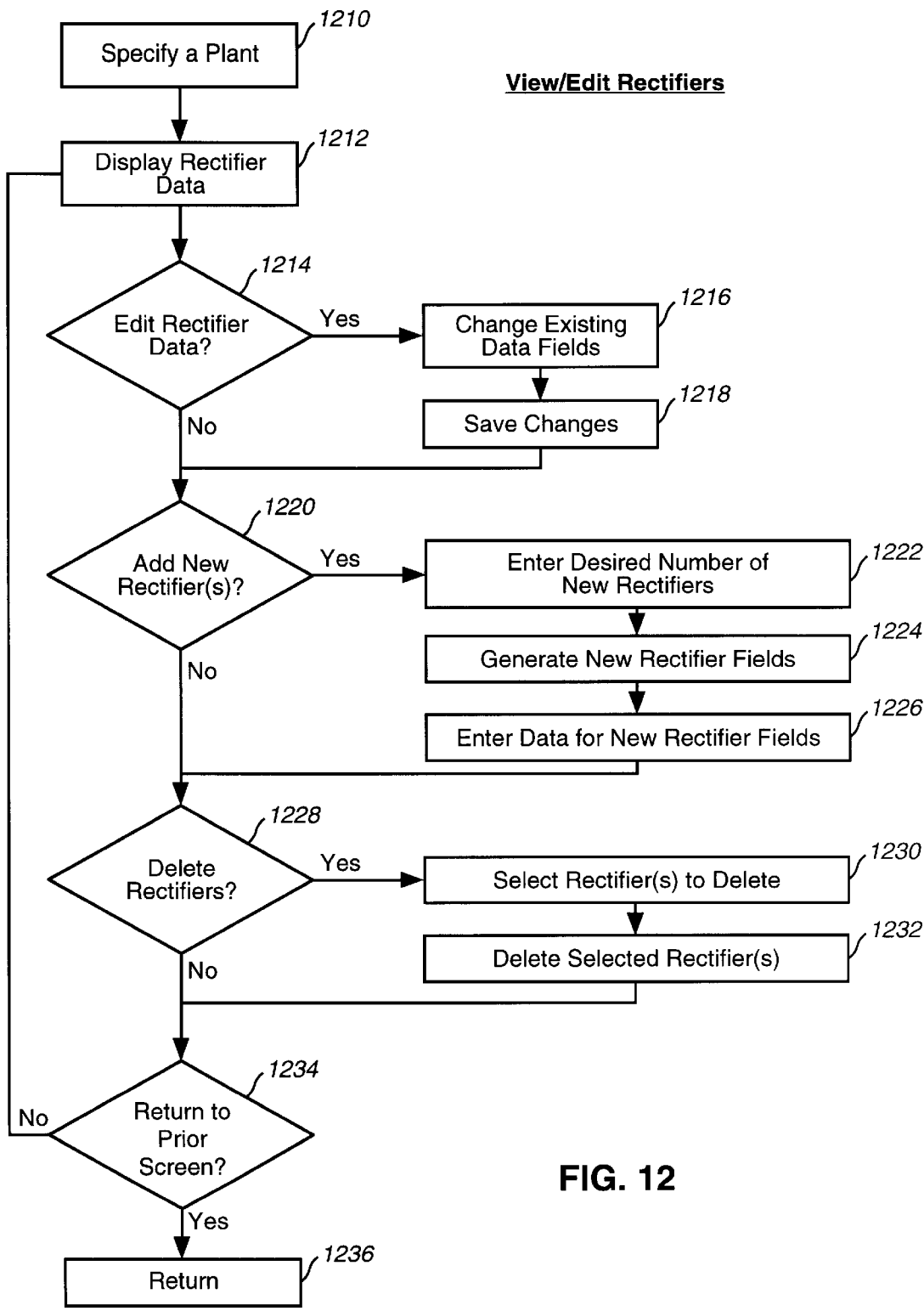
FIG. 12 is a flowchart depicting a process for adding, deleting and editing rectifier data associated with a plant in a database.

A user may view, edit, add or delete rectifiers from a particular battery plant by, for example, pointing to View/Edit Rectifiers button 1718. Referring to FIG. 12, a process is provided for editing rectifiers.

In step 1210, the user is prompted to select a plant 424. Preferably, the user is presented with a plant selection screen, such as screen 2210 for example. Recall that one or more rectifiers may be associated with each plant 424. Upon selection of a plant 424, control passes to step 1212.

In step 1212, the user is presented with a View/Edit Rectifiers screen, such as screen 2310 in FIG. 23, for example, displaying data for all of the rectifiers 414 associated with the selected plant 424. Preferably, the user is also provided with a number of options such as edit existing rectifiers, add new rectifiers, delete existing rectifiers and return to prior screen.

In step 1214, if the user wishes to edit rectifier data, control passes to step 1216. In step 1216, the user edits fields of rectifier data presented in step 1212. In step 1218, the user saves changes to database 520 by, for example, pointing to save changes button 2312. In power tables 710, this data replaces existing data in rectifier table 734. Changes may also be made to plant table 728, as necessary. After saving the changes, the user continues to be presented with a View/Edit Rectifiers screen, such as screen 2310, providing the user with rectifier add, edit and delete options for the battery plant selected in step 1210.

In step 1220, if the user wishes to add new rectifiers 414 to the plant 424 selected in step 1210, the user points to add button 2314 on screen 2310. Control then passes to step 1222 where the user is prompted to enter a desired number of new rectifiers 414.

In step 1224, a new row or entry is generated in rectifier table 734 for each new rectifier 414.

In step 1226, the user is prompted to enter data for each new rectifier. This new data is written into the new row or rows generated in rectifier table 414.

In step 1228, if the user wishes to delete a rectifier 414 from plant 424 selected in step 1210, control passes to step 1230. In step 1230, the user selects one or more rectifiers displayed in screen 2310 for deletion.

In step 1232, the user deletes the selected rectifiers from power tables 710 by pointing to remove button 2316. Entries in rectifier table 734, associated with the selected rectifier or rectifiers, are deleted.

In step 1234, the user may remain in the view/edit rectifiers screen or may return to the main control panel menu. If the user chooses to remain, control passes to step 1212 where the user continues to be presented with the choices of adding, deleting or edition rectifier data.

If the user selects to return to the main control panel screen, the user points to cancel button 2318 and control passes to step 1236 which immediately returns control to step 820 or 242.

Figure 13:
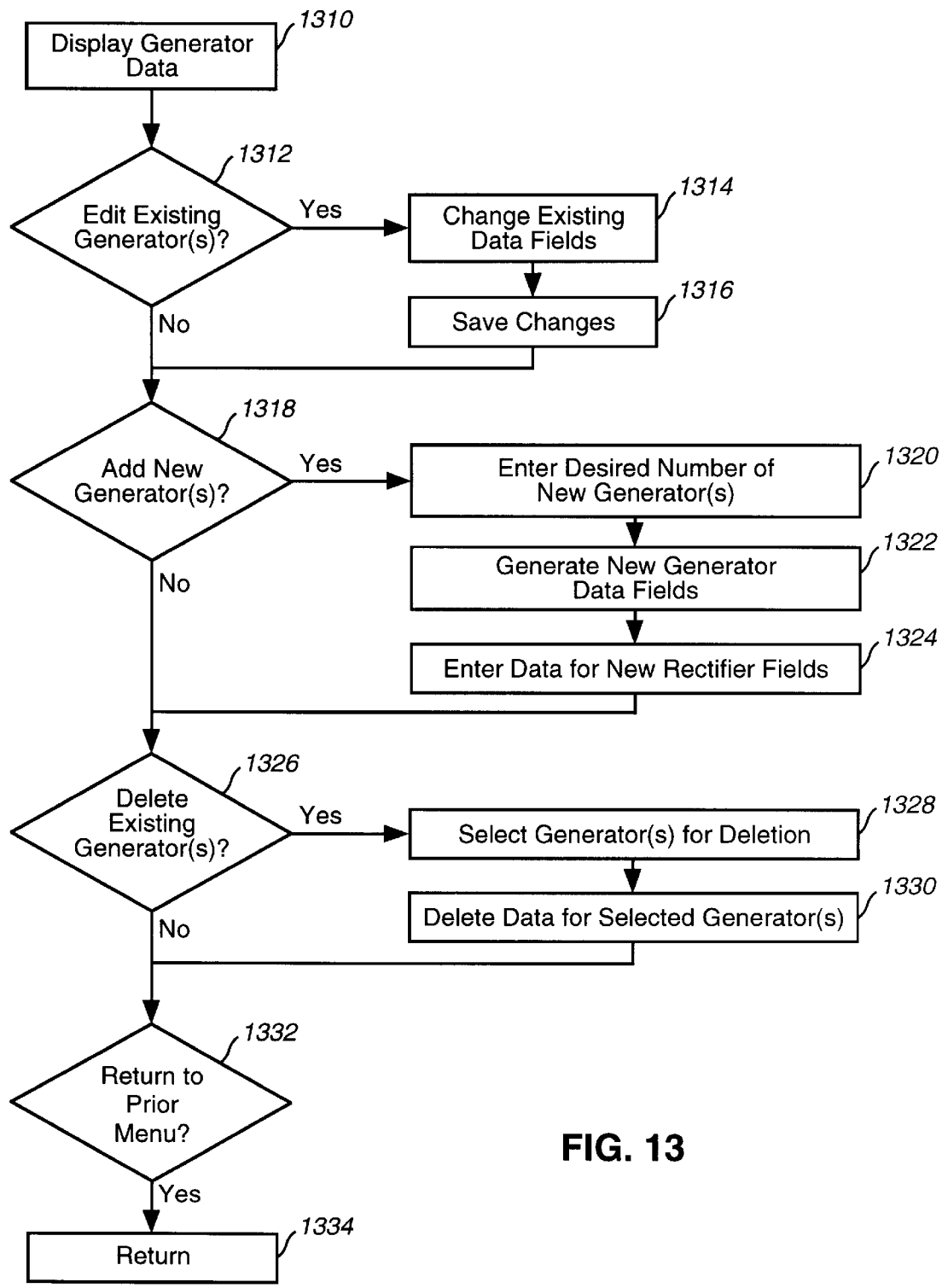
FIG. 13 is a flowchart depicting a process for adding, deleting and editing generator data associated with a plant in a database.

A user may choose to edit, add or delete generators from the site selected instep 812 by pointing to View/Edit Generators button 1720. Referring to FIG. 13, a process is provided for adding generator data.

Figure 24A:
FIG. 24A is a print-out of a web-page screen for adding, deleting and editing generator data associated with consumer equipment.

In step 1310, the user is presented with a display of generator data. Note that the user is not prompted to select a plant as in steps 1110 and 1210. This is because generators 422 are directly associated with the site selected in step 812. In other words, a single generator 422 may supply reserve AC power to many or all power plants 424 associated with a site. Battery string 418 and rectifiers 414, on the other hand, are associated with power plants 424 which are then associated a site. Preferably, the user is presented with a display screen such as View/Edit Generators screen 2410 in FIGS. 24A and 24B, for example.

Preferably, the display presented to the user includes a separate box or a window for each available generator, such as boxes 2412–2418. Each box 2412–2418 displays data contained in database 520 for a particular generator 422. This data is retrieved from generator table 716. The user is also preferably presented with an option box, such as option box 2420, for adding, deleting and editing generators.

In step 1312, if the user wishes to edit data associated with existing generators 422 for a site, control passes to step 1314. In step 1314, the user may edit data fields presented in step 1310. For example, where the user is presented with View/Edit Generator screen 2421 in step 1310, the user simply edits data fields within boxes 2412–2418.

In step 1316, the user saves any edits made in step 1314 by, for example, pointing to save changes button 2422. These changes are written over existing data in generator table 716.

In step 1318, the user may add new generators by, for example, pointing to add button 2424. Control then passes to step 1320 where the user is prompted to enter a desired number of new generators 422.

In step 1322, a new row or entry is generated in generator table 716 for each new generator entered in step 1320.

In step 1324, the user is prompted to enter data for each new generator. This data may include generator data: vendor name, model number, kilowatt rating, fuel type, and the length of time the generator can run on a tank of fuel into the new rows or entries generated in step 1322.

In step 1326, if the user wishes to delete existing generators, control passes to step 1328. In step 1328, the user selects one or more generators 422 for deletion. Where the user is presented with display 2410 in step 1310, the user simply points to one or more generator boxes 2412–2418.

In step 1330, the user deletes the generator or generators selected in step 1328 by, for example, pointing to remove button 2426. The rows or entries in generator table 716 associated with the selected generator or generators are then deleted.

In step 1332, the user may continue to be presented with View/Edit Generators screen 2410 or may return to the main control panel screen 1710. If the user selects to remain in the View/Edit Generators menu, control returns to step 1310. If the user selects to return to the main control panel screen, control passes to step 1334, which immediately returns control to step 820 or 824.

In step 820 and 824, the user may select to calculate a reserve time for which a plant 424 can operationally maintain consumer equipment 420. Preferably, a determination is made as to whether any additional rectifiers 414 are necessary for optimally supplying power to consumer equipment 420. On main control panel 1710, a user points to calculate reserve button 1724 and control passes to step 826, where reserve time is calculated for a plant 424.

Figure 19:
FIG. 19 is a print-out of a web-page screen for deleting plant records from a database.
Figure 25:
FIG. 25 is a print-out of a web-page screen for selecting a battery plant and for entering a load to calculate a reserve time.

Referring to FIG. 19, a detailed process for calculating reserve power is provided. In step 1412, the user is prompted to select a plant 424. Preferably, the user is presented with a display screen such as calculate reserve time screen 2510 in FIG. 25. In screen 2510, the user may select a battery plant name from a pull-down list of plant names in box 2512. Where the site was found in SiteVu database table 304, an actual load value is retrieved from plant table 302 (FIG. 3C). Where the site is in power tables 710, an actual load is retrieved from plant table 728. In either case, the user may change the value as necessary.

In step 1214, an actual load is entered for consumer equipment 420, as measured at coupling 416.

In step 1416, the user commands Power Page 109 to calculate a reserve time by, for example, pointing to OK box 2516. Calculation module 522 then collects necessary plant data. Where the site was found in Site View database table 304, plant data is retrieved from a configuration library. Where the site is in power tables 710, calculation module 522 at least retrieves battery data from battery table 722. When calculation module 522 has the necessary data, it calculates a reserve time for the selected battery plant 424 and consumer equipment 420. Preferably, calculation module 522 employs correction factors which exaggerate the load of consumer equipment 420 and understate the reserve potential of plant 424.

In step 1418, in a preferred embodiment, calculation module 522 determines the adequacy of existing rectifiers 414 to deliver the necessary current from off-site AC power source 408 and, where used, AC generator 422, to consumer equipment 420. Calculation module 522 employs the same actual load value entered in step 1414. Calculation module 522 retrieves rectifier data for the rectifier or rectifiers 414 associated with the plant 424 selected in step 1412. The data may be retrieved from a SiteVu configuration database or from rectifier table 734. Preferably, calculation module 522 employs correction factors which exaggerate the load of site 420 and understate the capabilities of rectifiers 414.

In step 1420, the user is presented with a display showing the calculated reserve time. The user may be presented with a display such as, for example, calculated reserve time screen 2610. In screen 2210, a calculated reserve time is provided in box 2624.

Also in screen 2610, the site name entered in step 812 is displayed in box 2614, a plant name is provided in box 2616, a voltage is provided in box 2618, a site type is provided in box 2620 and the actual load entered in step 1414 is provided in box 2622. The user may return to the calculate reserve time screen 2510 by pointing to close button 2612.

In step 1422; the user may return to the main control panel menu or calculate reserve power times for additional power plants. If the user wishes to calculate reserve times for additional power plants 424, control is returned to step 1412. If the user wishes to return to the main control panel, control is passed to step 1424 which immediately returns control to step 820 or 824.

In step 820 and 824, the user may run hypothetical scenarios by pointing to What-if Scenarios button 1728. Control is then passed to a what-if scenarios process (not shown). Any of a variety of what-if scenarios may be provided in order to permit a user at remote terminal 512 to run hypothetical scenarios, without altering the data stored in 108 or power tables 710.

Figure 27:
FIG. 27 is a print-out of a web-page screen for calculating reserve times for hypothetical power plants and loads.
Figure 26:
FIG. 26 is a print-out of a web-page screen displaying a calculated reserve time.

When a user selects what-if scenarios, the user is presented with a what-if scenarios screen, such as screen 2710 of FIG. 27, for example. Additional what-if scenario screens 2810 and 2910 in FIGS. 28 and 29 may also be available to the user. Preferably, data entered via what-if scenario screens is not stored with data associated with real sites. Instead, data entered via what-if scenario screens are preferably stored in tables similar to, but not associated with, power tables 710. Alternatively, data entered via what-if scenario screens may not be stored at all.

In step 820 and 824, the user may select a help screen, such as help screen 3010 in FIG. 30, by, for example, pointing to a help button, such as help button 1726.

In step 824, a user may select to disconnect from Power Page 109 by pointing to an exit button. Control then passes to step 828 where processing stops. Where the remote terminal 512 was coupled to Power Page 109 via web-based telecommunications links 516 and 518, link 516 preferably remains active, permitting the user to access other web-based systems.

The user may select to access formulas in formula database 520 by pointing to show formulas button 1722.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computerized method for remotely storing power plant data in a database and for calculating a reserve time for which a power plant can provide power to consumer equipment, the method comprising the steps of:
   (1) identifying a site associated with the power plant;
   (2) searching a site facility planner database for the site;
   (3) prompting a user to identify a power plant associated with the site if the site is located in a site facility planner database;
   (4) searching a temporary database for the site if the site is not located in a site facility planner database;
   (5) prompting the user to identify a power plant associated with the site and permitting the user to edit data associated with the power plant if the site is not located in a site facility planner database but is located in a temporary database;
   (6) generating a new site entry in the temporary database and prompting the user to enter power plant data associated with the new site if the site is not located in a site facility planner database and is not located in the temporary database;
   (7) prompting the user to identify a consumer equipment load value associated with the power plant; and
   (8) calculating a reserve time for which the power plant can supply power to the consumer equipment.

2. The method of claim 1, wherein step (8) further comprises the steps of:
   (a) retrieving battery data associated with the power plant from the site facility planner database if the site was located in a site facility planner database;
   (b) retrieving battery data associated with the power plant from the temporary database if the site was not located in a site facility planner database;
   (c) calculating a stored potential value of the power plant based on the retrieved battery data associated with the power plant;
   (d) calculating a time for which the power plant can supply power to the consumer equipment.

3. The method of claim 2, wherein step (d) further comprises the step of: calculating a time for which the power plant can supply power to the consumer equipment based upon the consumer equipment load value and the stored potential value of the power plant.

4. The method of claim 2, wherein step (d) further comprises the steps of:
   (a) generating a corrected load value of the consumer equipment by multiplying the consumer equipment load value by a load correction factor which exaggerates the consumer equipment load value;
   (b) generating a corrected stored potential value for the power plant by multiplying the stored potential value for the power plant by a power plant correction factor which understates the stored potential value for the power plant; and
   (c) calculating a time for which the power plant can supply power to the consumer equipment based upon the corrected load value of the consumer equipment and the corrected stored potential of the power plant.

5. A computerized method for remotely calculating a reserve time for which a power plant can provide power to consumer equipment, the method comprising the steps of:
   (1) retrieving a consumer equipment load value from a relational database;
   (2) retrieving UPS batter data associated with the power plant from a relational database;
   (3) calculating a stored potential value of the power plant based on the retrieved UPS data; and
   (4) calculating a time for which the power plant can supply power to the consumer equipment.

6. The method of claim 5, wherein step (4) further comprises the step of: calculating a time for which the power plant can supply power to the consumer equipment based upon the consumer equipment load value and the stored potential value of the power plant.

7. The method of claim 5, wherein step (4) further comprises the steps of:
   (a) generating a corrected load value of the consumer equipment by multiplying a consumer equipment load value by a load correction factor which exaggerates the consumer equipment load value;
   (b) calculating a stored potential value of the power plant based on battery data associated with the power plant;
   (c) generating a corrected deliverable stored potential value for the power plant by multiplying the stored potential of the power plant by a power plant correction factor which understates the store potential value for the power plant; and
   (d) calculating a time for which the power plant can supply power to he consumer equipment, based upon the corrected load value of the consumer equipment and the corrected deliverable stored potential value for the power plant.

8. The method of claim 5, wherein step (1) further comprises the steps of:

(a) retrieving the consumer equipment load value from a database;

(b) permitting a user to edit the consumer equipment load value; and (c) generating a corrected consumer equipment load value by multiplying the consumer equipment load value by a load correction factor which exaggerates the consumer equipment load value.

9. The method of claim 5, wherein step (2) further comprises the steps of:

(a) retrieving battery data associated with the power plant from a relational database;

(b) permitting a user to edit the battery data associated with the power plant; and (c) calculating a stored potential value of the power plant based on battery data the associated with the power plant.

10. The method of claim 5, wherein step (2) further comprises the steps of:

(a) retrieving battery data associated with the power plant from a site facility planner database;

(b) denying users access to the battery data associated with the power plant; and (c) calculating a stored potential value of the power plant based on the battery data associated with the power plant.

11. A web-based general purpose computer system for remotely entering plan data into a database and for calculating a reserve time for which a power plant can provide power to consumer equipment, comprising:

(a) a SiteVu power pages (SVPP) module comprising a data input module for receiving power plant data from users at remote workstations and for inputting receiving power plant data into a relational database and a calculation module for calculating reserve time for which a power plant can supply power to consumer equipment;

(b) a web browser interface for interfacing users at remote workstations with said data input module and said calculation module; and (c) a power table relational database for receiving power plant data from said data input module and for providing power plant data to said calculation module for calculation of reserve times.

12. The system for claim 11, wherein said data input module comprises means for inputting a consumer equipment load value into a site facility planning database and for inputting plant data and consumer equipment load values into said relational database.

13. The system of claim 11, wherein said data input module comprises means for editing consumer equipment load values in a site facility planning database and means for editing plant data and consumer equipment load values in said relational database.

14. The system of claim 11, wherein said power pages module further comprises means for querying a database for an entry associated with a site selected by a user.

15. The system of claim 14, wherein said means for querying a database includes means for querying a site facility planner database for an entry associated with a site selected by a user and means for querying said power tables relational database for an entry associated with a site selected by a user.

16. The system of claim 15, wherein said data input module comprises means for generating new entries in said relational database for new sites entered by a user.

17. The system of claim 11, wherein said relational database comprises:

(a) a site table for storing data associated with sites;

(b) a power plant table for storing data associated with power plants;

(c) means for associating entries in said power plant table with entries in said site table;

(d) a battery table for storing battery data associated with power plants;

(e) means for associating entries in said battery table with entries in said power plant table;

(f) one or more component tables for identifying components associated with power plants and sites; and (g) means for associating entries in said one or more component tables with entries in said power plant table and said site table.

18. The system of claim 17, wherein said one or more component tables comprise:

(a) a rectifier table for storing rectifier data associated with power plants;

(b) means for associating entries in said rectifier table with entries in said power plant table;

(c) an uninterruptible power supply (UPS) table for storing uninterruptible power supply data associated with power plants;

(d) means for associating entries in said UPS table with entries in said power plant table;

(e) a generator table for storing generator data associated with sites; and (f) means for associating entries in said generator table with entries in said site table.

* * * * *